United States Patent [19]
Tozu et al.

[11] Patent Number: 5,711,585
[45] Date of Patent: Jan. 27, 1998

[54] WHEEL BRAKE PRESSURE CONTROLLING SYSTEM IN WHICH VEHICLE OPERATING CONDITIONS ARE CALCULATED TO ALTER WHEEL BRAKE PRESSURE

[75] Inventors: Kenji Tozu, Yokkaichi; Norio Yamazaki, Kariya; Jun Mihara, Toyoake; Takayuki Itoh, Nagoya; Yoshiharu Nishizawa, Nagoya; Seiichi Kojima, Handa; Hiromu Kuromitsu, Chiryu, all of Japan

[73] Assignee: Aisin Seiki Kabushiki Kaisha, Kariya, Japan

[21] Appl. No.: 562,809

[22] Filed: Nov. 27, 1995

[30] Foreign Application Priority Data

| Nov. 28, 1994 | [JP] | Japan | 6-292705 |
| Apr. 10, 1995 | [JP] | Japan | 7-084052 |
| May 29, 1995 | [JP] | Japan | 7-130196 |

[51] Int. Cl.$^6$ ............... B60T 8/04; B60T 8/60
[52] U.S. Cl. ............... 303/146; 303/140
[58] Field of Search ............... 363/147, 148, 363/149, 146, 140, 139

[56] References Cited

U.S. PATENT DOCUMENTS

| 4,809,181 | 2/1989 | Ito et al. | 303/146 |
| 4,898,431 | 2/1990 | Karnopp et al. | 303/146 |
| 5,224,765 | 7/1993 | Matsuda | 303/146 |
| 5,305,218 | 4/1994 | Ghoneim | 303/140 |
| 5,328,255 | 7/1994 | Isella | 303/146 |
| 5,333,058 | 7/1994 | Shiraishi et al. | 303/146 |
| 5,341,297 | 8/1994 | Zomotor et al. | 303/146 |
| 5,474,369 | 12/1995 | Inagaki et al. | 303/146 |
| 5,482,133 | 1/1996 | Iwata et al. | 303/140 |

FOREIGN PATENT DOCUMENTS

| 38175 | 2/1990 | Japan . |
| 70561 | 3/1990 | Japan . |
| 151556 | 6/1990 | Japan . |
| 500331 | 1/1991 | Japan . |
| 42360 | 2/1991 | Japan . |
| 500868 | 2/1991 | Japan . |
| 257757 | 9/1992 | Japan . |
| 85327 | 4/1993 | Japan . |
| 85336 | 4/1993 | Japan . |
| 85340 | 4/1993 | Japan . |
| 221300 | 8/1993 | Japan . |
| 156249 | 6/1994 | Japan . |

*Primary Examiner*—Matthew C. Graham
*Attorney, Agent, or Firm*—Burns, Doane, Swecker & Mathis, LLP

[57] ABSTRACT

A wheel brake pressure controlling system includes a brake pressure operating circuit for selectively supplying to a wheel brake a primary pressure generated by a vacuum booster in response to the depression of a brake pedal and a secondary pressure generated by a hydraulic pressure pump which is driven by an electric motor, a microcomputer for estimating a turning of vehicle, determining if a turning of the vehicle is in a over- or under-steer region, and for determining a wheel brake, the pressure of which is to be intensified if the turning of the vehicle lies in the over- or under-steer region, and an output controller for supplying the secondary pressure to the wheel brake which has been thus determined, through the brake pressure operating circuit. The microcomputer determines if the turning of a vehicle occurs in a reference region located outside the over- or under-steer region, and whenever the turning of the vehicle occurs in the reference region, drives the second source of pressure for generating the secondary pressure, determines a wheel brake which is to be intensified, and automatically intensifies the wheel brake.

8 Claims, 24 Drawing Sheets

WHEEL BRAKE PRESSURE CONTROLLING SYSTEM IN WHICH VEHICLE OPERATING CONDITIONS ARE CALCULATED TO ALTER WHEEL BRAKE PRESSURE

FIELD OF THE INVENTION

The invention relates to a system for controlling a braking hydraulic pressure applied to a wheel brake, and more particularly, while not intended to be limited thereto, to a wheel brake pressure controlling system which is preferred for use in a braking force distribution control in which a distribution of braking efforts exerted by front and rear and left and right wheel brakes, which is required to maintain and secure a running stability and a steerability in the presence of a steering operation, an acceleration/deceleration, an inclination of a road surface, an unevenness of the road and similar factors which represent an operating or running condition of a vehicle, is calculated in order to increase or decrease the brake pressures of the respective wheel brakes individually in accordance with such distribution.

BACKGROUND OF THE INVENTION

Usually, a brake master cylinder applies a brake pressure (primary pressure), which corresponds to the pressure of depression of a brake pedal operated by a driver, to wheel brakes. An antiskid control (ABS control) takes place by estimating a moving speed of a vehicle body (reference speed) from the rotational speeds of a plurality of wheels, calculating or estimating a wheel slip rate or a coefficient of friction $\mu$ of a road surface on the basis of the reference speed and the rotational speeds of wheels, reducing (or decreasing) wheel brake pressures in order to avoid a wheel lock or a perfect interruption of rotation of wheels when the vehicle body continues moving, and subsequently increasing the brake pressures so as to achieve as short a braking distance as possible, and if required, repeating such decompression or intensification. At this end, there are provided increasing/reducing (or decreasing) valves for increasing or reducing (or decreasing) the wheel brake pressures, and a source of pressure comprising a hydraulic pump for feeding a pressure (secondary pressure) higher than the primary pressure to a first pressure line so as to be applied to these increasing/reducing (or decreasing) valves, and an electric motor which drives the pump. An electronic controller which executes an ABS control supplies the secondary pressure from the source to the increasing/reducing (or decreasing) valves whenever it determines a need for an automatic intervention which alters the wheel brake pressures, and selectively switches the wheel brakes between a low pressure (drain pressure) and the secondary pressure by utilizing the increasing/reducing (or decreasing) valves. The brake pressures are reduced when the low pressure is supplied, and rise when the secondary pressure is supplied. A kind of such ABS control is disclosed in Japanese Laid-Open Patent Application No. 38,175/1990.

Recently, a braking force distribution control is proposed in which in addition to controlling the wheel brake pressures on the basis of the wheel slip rate and the braking distance during the braking of a vehicle, a distribution of braking efforts of the front and rear, and left and right wheel brakes is calculated by an electronic controller in order to assure a directional stability of the vehicle being braked in accordance with the operating and running condition of the vehicle as well as a load distribution on the vehicle, and in which the wheel brake pressures are regulated to achieve such distribution by utilizing the increasing/reducing (or decreasing) valves. The present inventors have made such proposals in Japanese Laid-Open Patent Applications No. 85,327/1993, No. 85,340/1993 and No. 85,336/1993, for example.

Also, Japanese Laid-Open Patent Application No. 500,868/1991 describes detecting a lateral slip angle of the vehicle, and increasing the front wheel brakes to establish a high slip for the front wheels, whenever the presence of a lateral slip is found. In Japanese Laid-Open Patent Application No. 221,300/1993, another brake pressure control is disclosed in which a lateral slip angular rate $D\beta$ is calculated as follows:

$$D\beta = Gy/Vso - \gamma$$

where Gy represents a lateral acceleration, Vso an estimated vehicle body speed and $\gamma$ a yaw rate. Whenever the absolute magnitude of the lateral slip angular rate $D\beta$ is equal to or greater than a given value, a selected wheel brake pressure is changed in accordance with the polarity of the angular rate $D\beta$. Specifically, if it is positive, the rear, left wheel brake pressure is intensified while if it is negatived the rear, right wheel brake pressure is intensified, thereby suppressing an excessive yawing. In another disclosure, it is proposed to integrate the lateral slip angular rate $D\beta$ to derive a lateral slip angle $\beta$, which is used as a parameter in order to control an excessive yawing. The purpose of these conventional approaches are intended to suppress an unintended turning or an over-turning.

On the other hand, Japanese Laid-Open Patent Application No. 42,360/1991 discloses a proposal in which an under-steer of a vehicle body being steered is compensated for by calculating a vehicle speed at a tire grip limit corresponding to a steer angle, and increasing wheel brake pressures whenever the vehicle body speed exceeds the limit speed. Specifically, a combination of a steer angle and a vehicle body speed is examined to see if it lies in a predetermined slip zone, and if it is found that such combination lies in the slip zone, the wheel brake pressures are intensified. Such control employs a hydro-booster, but in some instance, a vacuum booster is also used in a more inexpensive system.

It is to be noted that the intensification of the wheel brake pressures in order to suppress or compensate for an over-steer or under-steer takes place when a brake pedal is not being depressed by a driver. If a vacuum booster is employed, a pump pressure can be generated by providing a braking hydraulic pump unit in addition to a foot pedal braking system. A brake master cylinder cut-off valve and a reservoir suction valve are interposed between a discharge pressure line (a primary pressure) of the foot pedal braking system and a pump pressure (a secondary pressure) and individual wheel brakes for selectively supplying the primary or the secondary pressure to the latter. An open/close solenoid valve which individually intensifies a wheel brake is interposed between a solenoid-operated switching valve and a wheel brake, and an open/close solenoid valve which individually decompresses a wheel brake is connected to the wheel brake. In this manner, the wheel brakes can be individually intensified or decompressed if the brake pedal is not depressed. In order to allow an intensification of wheel brakes which is required to suppress or compensate for an over-steer or an under-steer when the brake pedal is not being depressed, it is necessary that the braking hydraulic pump unit be normally driven, immediately upon starting an onboard engine. However, this results in an unnecessary dissipation of the engine power since the described intensification is not always required.

To avoid this, there is proposed an arrangement in which the braking hydraulic pump unit is driven upon detecting the need for an intensification. For example, Japanese Laid-Open Patent Application No. 156,249/1994 discloses a wheel brake pressure controlling system in which upon detecting a given behavior of a vehicle, wheel brakes are automatically intensified in order to suppress an unstable behavior of the vehicle. The system includes a pre-pressurizing pump, which is driven when the automatic intensification is required. However, starting the pump when the need for an intensification is found cannot avoid a lag in activating the intensification.

SUMMARY OF THE INVENTION

The invention has for its first object avoiding an unnecessary drive of a brake hydraulic pump unit, which is provided separately from a foot pedal braking system, as much as possible while avoiding a lag in activating the intensification, and has for its second object providing a smooth, and highly reliably start of the intensification.

The invention is characterized in determining if a turning of a vehicle lies in a reference zone located outside either an over- or under-steer zone, and whenever it is found that the turning lies in the reference zone, driving the second source of brake pressure for generating the secondary pressure, determining a wheel brake or brakes for which the need for an intensification is highly probable and automatically increasing such wheel brake pressures.

DESCRIPTION OF PREFERRED EMBODIMENT

Figure 1:
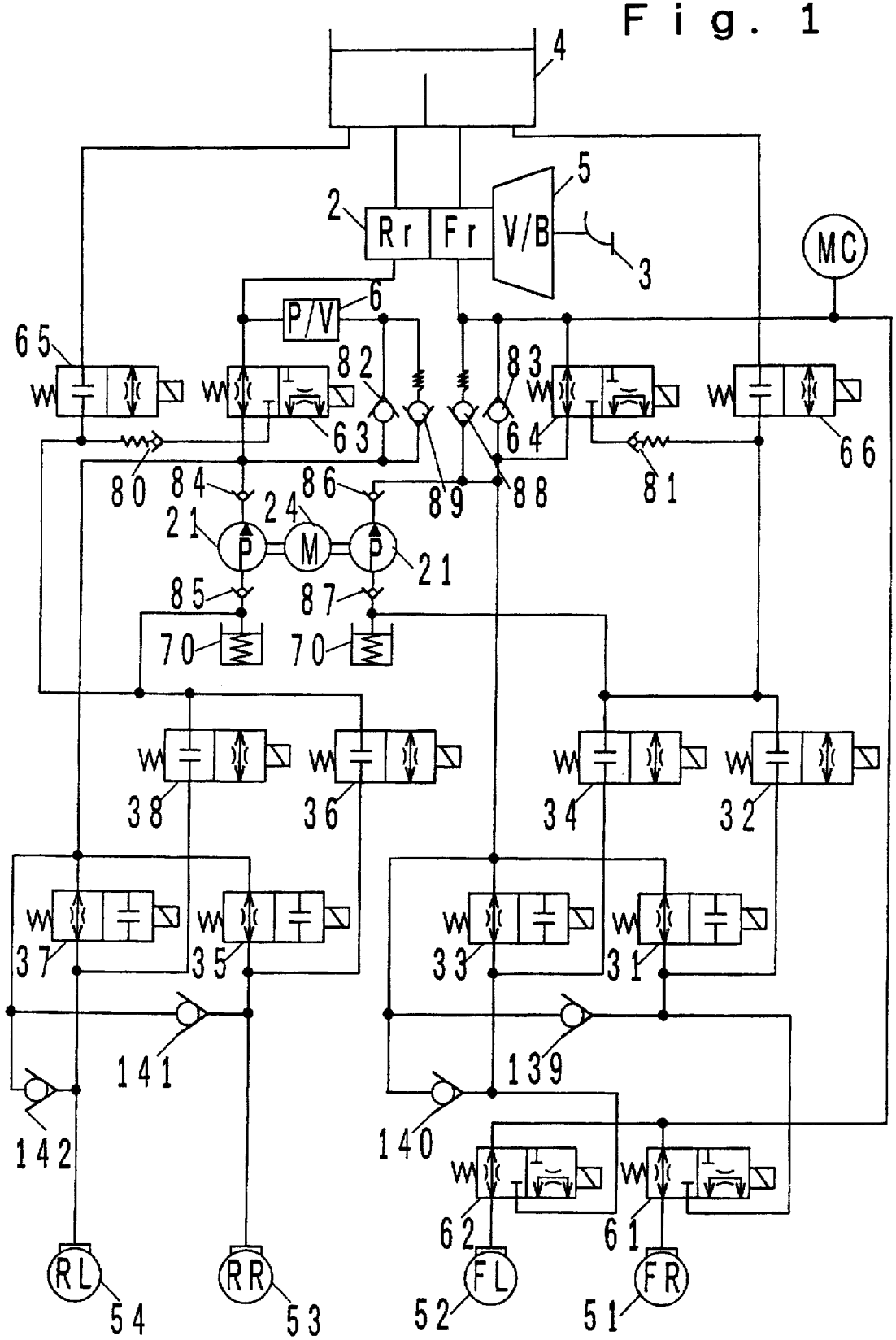
FIG. 1 is a block diagram of one embodiment of the invention.
Figure 2:
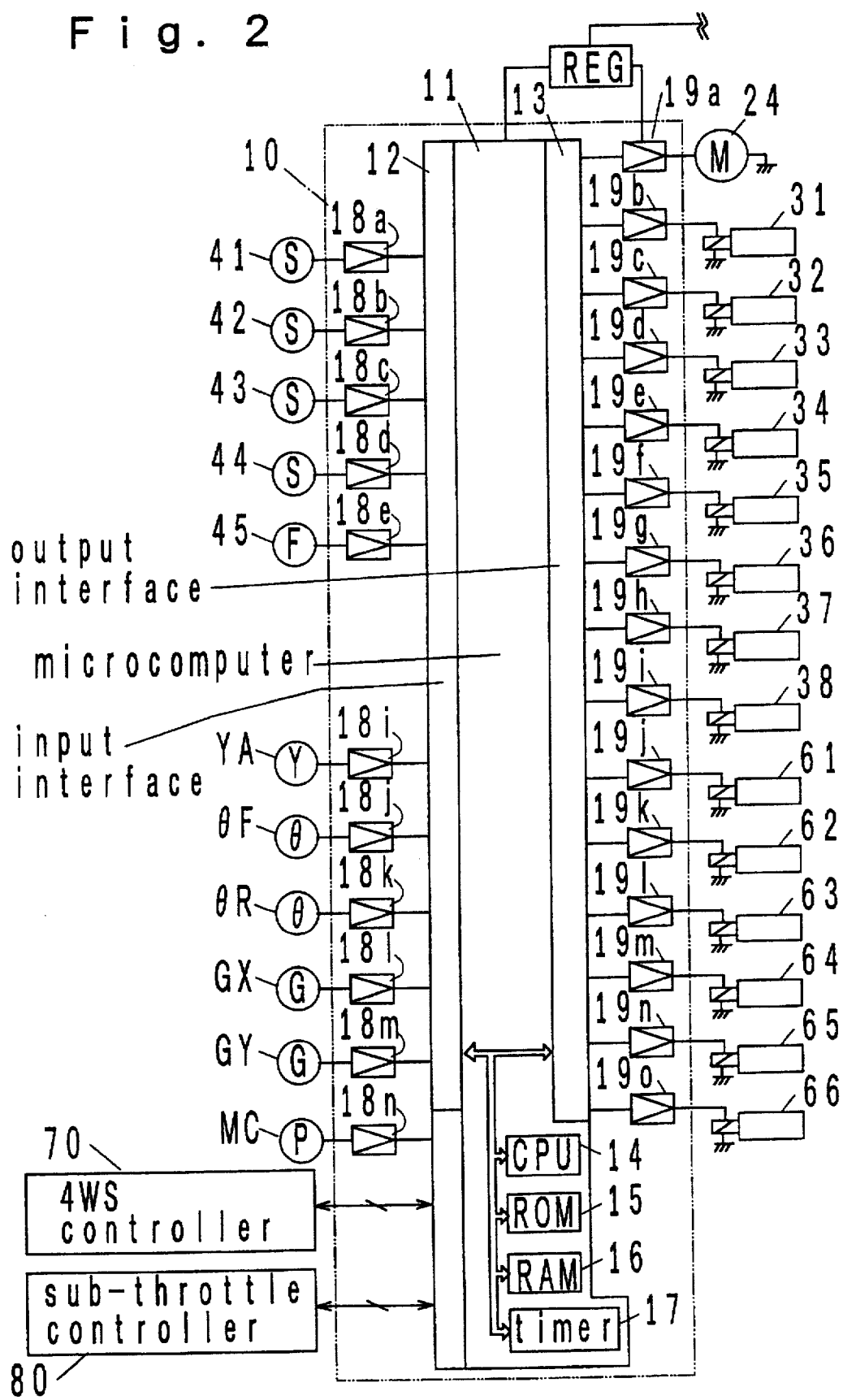
FIG. 2 is a block diagram showing a general arrangement of an electronic controller for controlling the energization of solenoid valves used in a wheel brake pressure system shown in FIG. 1.

FIG. 1 shows a wheel brake pressure system according to one embodiment of the invention, and FIG. 2 contains a summary of an electrical system to which various solenoid valves and sensors of the wheel brake pressure system are connected and which controls the pressures of wheel brakes 51 to 54.

Initially referring to FIG. 1, when a brake pedal 3 is depressed by a driver, a master cylinder 2 of tandem type generates a fluid pressure for front wheel brakes and a fluid pressure for rear wheel brakes in a manner corresponding to the pressure applied to depress the brake pedal. In the condition shown in FIG. 1, the fluid pressure for front wheel brakes are applied to a wheel brake 51 associated with a front, right wheel FR and a wheel brake 52 associated with a front, left wheel FL through solenoid operated switching valves 61 and 62, respectively. The fluid pressure for the rear wheel brakes are applied through a solenoid operated switching valve 63, and thence through a solenoid valve 35 to a wheel brake 53 associated with a rear, right wheel RR and through a solenoid valve 37 to a wheel brake 54 associated with a rear, left wheel RL.

A pump 21 is driven by an electric motor 24, and operates to withdraw a braking hydraulic from a reservoir 70, which is returned from the individual wheel brakes 51, 52, 53, 54, and to return it to the upstream side.

The solenoid operated switching valve 61 switches between a front wheel master cylinder pressure (primary pressure) and the discharge pressure from the pump 21 (secondary pressure) as supplied to the front, right wheel brake 51. When its electrical coil is not energized, the valve 61 supplies the front wheel master cylinder pressure to the front, right wheel brake S1 as shown in FIG. 1, but when it is energized simultaneously with a solenoid operated switching valve 64 and an open/close slenoid valve 66, the front wheel master cylinder pressure is cut by the valve 64 while the valve 66 allows a communication between the pump 21 and the reservoir 4, whereby the pump 21, being driven, generates a pump pressure (secondary pressure). The secondary pressure communicates with a relief valve 81 which serves as a relief mechanism, allowing the secondary pressure to be applied to the front, right wheel brake 51 through an increasing solenoid valve 31. The switching valve 62 switches between the front wheel master cylinder pressure (primary pressure) and the discharge pressure from the pump 21 (secondary pressure) as supplied to the front, left wheel brake 52. Specifically, when its electrical coil is not energized, the valve 62 applies the front wheel master cylinder pressure to the front, left wheel brake 52 as shown in FIG. 1, but when its coil is energized simultaneously with the valves 64 and 66, the valve 64 cuts the front wheel master cylinder pressure while the valve 66 allows the communication between the pump 21 and the reservoir 4, whereby the pump 21, being driven, generates the pump pressure (secondary pressure). This secondary pressure communicates with the relief valve 81, again serving as a relief mechanism, whereby the secondary pressure is applied to the front, left wheel brake 52 through an increasing solenoid valve 33. The solenoid operated switching valve 63 switches between the rear wheel master cylinder pressure (primary pressure) and the secondary pressure. Specifically, when its electrical coil is not energized, the valve 63 applies the rear wheel master cylinder pressure to the valves 35, 37, but when the electrical coil is energized simultaneously with the open/close solenoid valve 65, the rear wheel master cylinder pressure is cut while a communication is established between the pump 21 and the reservoir 4, whereby the pump 21, being driven, generates the pump pressure (secondary pressure). The secondary pressure communicates with a relief valve 80, which serves as a relief mechanism, and the secondary pressure is applied to the solenoid valves 35, 37.

When the solenoid valves 31, 33, 35 and 37 are energized to close these valves and when solenoid valves 32, 34, 36 and 38 are energized to open these valves, the pressures in the front, right wheel brake 51, front, left wheel brake 52, rear, right wheel brake 53 and rear, left wheel brake 54 are discharged to the reservoir 4 through the solenoid valves 32, 34, 36 and 38, respectively.

The brake pressure system shown in FIG. 1 includes a brake pressure transmitting sub-system which applies only the output pressure from the brake master cylinder 2 to the wheel brakes, a brake pressure transmitting sub-system which is effective during the antiskid control, a brake pressure transmitting system which is effective during a traction control, and a brake pressure transmitting sub-system which is effective during a braking force distribution control. Individual elements which constitute these sub-systems for each of the wheel brakes are listed in Tables 1 and 2 below. It is to be noted that in these Tables, the elements which constitute each of the transmitting sub-system are arranged in the order starting from the particular wheel brake and directed toward the source of brake pressure. It is also to be noted that in the Tables 1 and 2 and in the drawings, "antiskid control" is abbreviated as "ABS control", and "traction control" by "TRC control", it being understood that "ABS" stands for "antiskid" and "TRC" for "traction control". The braking effort distribution control in the present embodiment includes "B-STR control" covering the entire wheel brakes, and "2-BDC control" which covers only the rear two wheel brakes. In addition, the "B-STR control" which covers the entire wheel brakes is sub-divided into a "B-STR-OS" control which is effective to suppress an over-steer and "B-STR-US" control which is effective to suppress an under-steer.

TABLE 1 wheel brake pressure system for front (driven) wheels wheel brake 51 for front-right wheel FR

| | |
|---|---|
| foot brake pressure sub-system | wheel brake 51 switching valve 61 (deenergized) M/C 2 (Fr) |
| ABS control pressure sub-system | wheel brake 51 switching valve 61 (energized) switching valve 64 (deenergized) motor 24 (energized) M/C 2 (Fr) |
| B-STR control pressure sub-system | wheel brake 51 switching valve 61 (energized) switching valve 64 (energized) open/close valve 66 (energized) motor 24 (energized) | wheel brake 52 for front-left wheel FL

| | |
|---|---|
| foot brake pressure sub-system | wheel brake S2 switching valve 62 (deenergized) M/C 2 (Fr) |
| ABS control pressure sub-system | wheel brake 52 switching valve 62 (energized) switchsing valve 64 (deenergized) motor 24 (energized) M/C 2 (Fr) |
| B-STR control pressure sub-system | wheel brake 52 switching valve 62 (energized) switching valve 64 (energized) open/close valve 66 (energized) motor 24 (energized) |

TABLE 2 wheel brake pressure system for rear (driving) wheels wheel brake 53 for rear-right wheel RR

| | |
|---|---|
| foot brake pressure sub-system | wheel brake 53 switching valve 63 (deenergized) master cylinder 2 (Rr) |
| ABS control pressure sub-system | wheel brake S3 switching valve 63 (deenergized) motor 24 (energized) master cylinder 2 (Rr) |
| B-STR control pressure sub-system | wheel brake 53 switching valve 63 (energized) open/close valve 65 (energized) motor 24 (energized) |
| TRC control pressure sub-system | wheel brake 53 switching valve 63 (energized) open/close valve 65 (energized) motor 24 (energized) |
| 2-BDC control pressure sub-system | wheel brake 53 switching valve 63 (deenergized) motor 24 (energized) master cylinder 2 (Rr) | wheel brake 54 for rear-left wheel RL

| | |
|---|---|
| foot brake pressure sub-system | wheel brake 54 switching valve 63 (deenergized) master cylinder 2 (Rr) |
| ABS control pressure sub-system | wheel brake 54 switching valve 63 (deenergized) motor 24 (energized) master cylinder 2 (Rr) |
| B-STR control pressure sub-system | wheel brake 54 switching valve 64 (energized) open/close valve 66 (energized) motor 24 (energized) |
| TRC control pressure | wheel brake 54 switching valve 64 (energized) |

TABLE 2-continued

| wheel brake pressure system for rear (driving) wheels | |
| --- | --- |
| sub-system | open/close valve 66 (energized) |
| | motor 24 (energized) |
| 2-BDC control | wheel brake 54 |
| pressure | switching valve 63 (deenergized) |
| sub-system | motor 24 (energized) |
| | master cylinder 2 (Rr) |

In each of "2-BDC control", "B-STR control" and "TRC control", whenever an intensification is required, an electronic controller 10 (FIG. 2) deenergizes the solenoid valves 32, 34, 36, 38 (to thereby open these valves), and deenergizes the solenoid valves 31, 33, 35, 37 (to open these valves). Whenever a decompression is required, the solenoid valves 32, 34, 36, 38 are energized (to open these valves), while the solenoid valves 31, 33, 35, 37 are energized (to close these valves). When a current brake pressure is to be maintained, the solenoid valves 32, 34, 36, 38 are deenergized (to close these valves) while the solenoid valves 31, 33, 35, 37 are energized (to close these valves).

Referring to FIG. 2, the electronic controller 10 essentially comprises a microcomputer 11 which includes CPU 14, ROM 15, RAM 16 and a timer 17 as essential elements. In addition, the electronic controller 10 includes signal processing circuits 18a–18n which energize sensors and produce detecting signals, an input and an output interface 12, 13 which feed the detecting signals to the microcomputer 11 as input and which supply control signals from the microcomputer 11 to drivers 19a–19o, motor driver and solenoid drivers 19a–19o, and a regulator REG which controls a voltage to be applied to a motor 24 from the motor driver 19a.

The rotational speed of each of front-right, front-left, rear-right and rear-left wheels 51 to 54 is detected by wheel speed sensors 41 to 44, respectively, and an electrical signal indicating respective wheel speed is produced by each of signal processing circuits 18a–18d and then fed to the input interface 12. A stop switch 45 is closed during the depression of a brake pedal 3, and an electrical signal representing an open condition (corresponding to the absence of depression of the pedal 3) or "off", or a closed condition (corresponding to the depression of the pedal 3) or "on" of the stop switch 45 is produced by signal processing circuit 18e and is fed to the input interface 12.

A yaw rate of a vehicle body is detected by a yaw rate sensor YA, and an electrical signal representing actual yaw rate γ is produced by signal processing an circuit 18i and is fed to the input interface 12. An angle of rotation of a steering wheel is detected by a front wheel steer angle sensor θF, and an electrical signal representing the front wheel steer angle θf is produced by signal processing circuit 18j and is fed to the input interface 12. The steer angle of the rear wheel is detected by a rear wheel steer angle sensor θR, and an electrical signal representing the rear wheel steer angle θr is produced by signal processing circuit 18k and is fed to the input interface 12. An acceleration gx in the fore-and-aft direction of the vehicle body is detected by an acceleration sensor (or GX sensor), and an electrical signal representing the fore-and-aft acceleration is produced by signal processing circuit 18l and is fed to the input interface 12. A lateral acceleration gy of the vehicle body is detected by an acceleration sensor (or GY sensor), and an electrical signal representing a lateral acceleration is produced by signal processing circuit 18m and is fed to the input interface 12.

A pressure sensor MC detects the pressure supplied from the master brake cylinder to a front wheel brake, and an electrical signal representing the detected pressure is produced by signal processing circuit 18n and is fed to the input interface 12.

Figure 3:
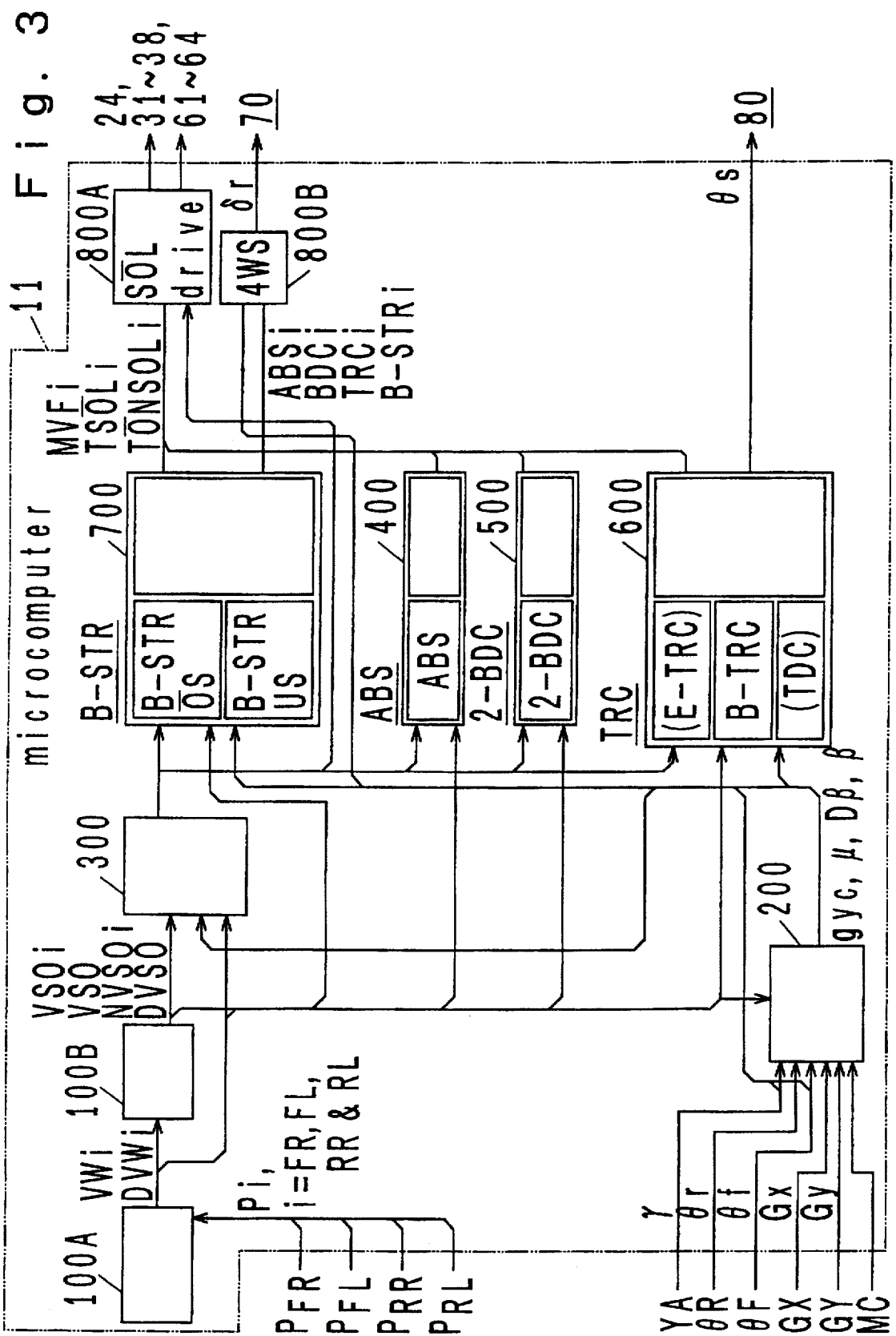
FIG. 3 is a block diagram of various control functions, delineated in blocks, associated with a wheel brake pressure control by a microcomputer 11 shown in FIG. 2.
Figure 4:
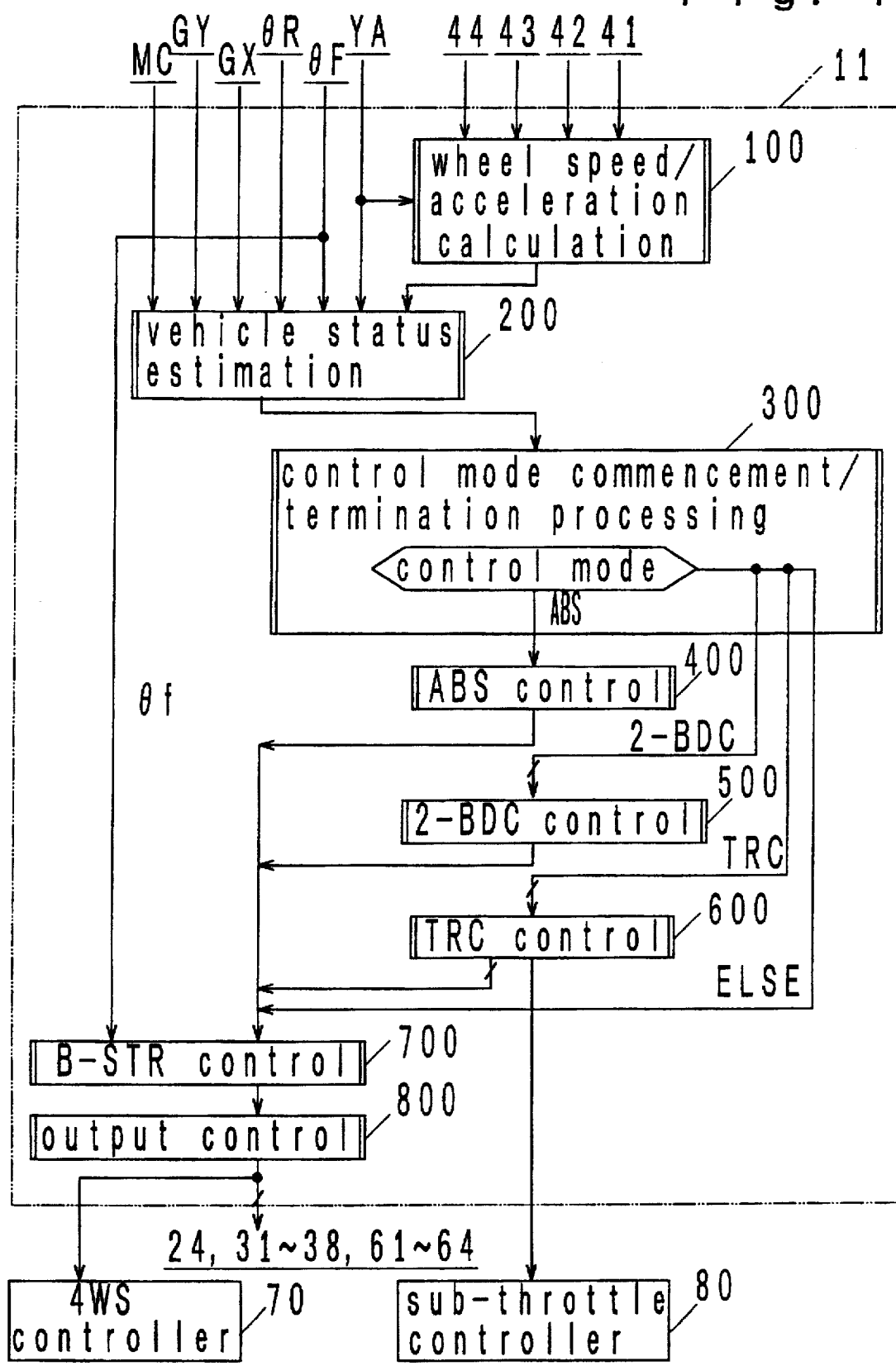
FIG. 4 is a flow chart of a wheel brake pressure control by the microcomputer 11 shown in FIG. 2, principally indicating a flow of information.

FIGS. 3 and 4 illustrate a summary of processing function performed by the microcomputer 11 shown in FIG. 2. FIG. 3 illustrates the processing function in a hardware configuration, as delineated in blocks, FIG. 4 illustrates a flow chart in a similar block delineation, and FIG. 5 shows a flow chart of an entire process of repeating the processing functions.

Figure 5:
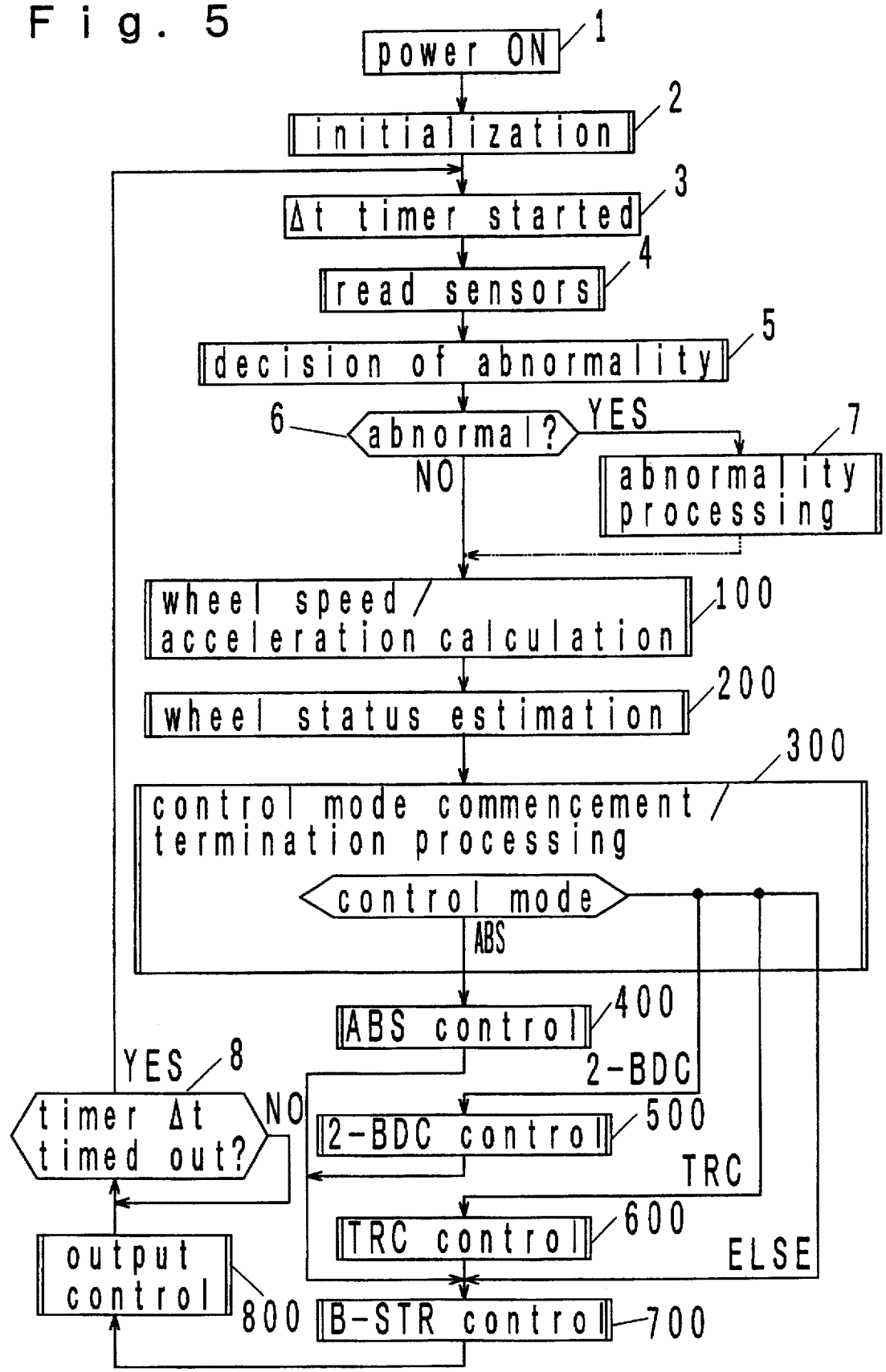
FIG. 5 is a flow chart of the wheel brake pressure control by the microcomputer 11 shown in FIG. 2, principally indicating a control operation.

Referring to FIG. 5, an onboard engine is started, and a power source contained in an onboard electrical system is turned on. After the voltage from the source is stabilized, operating voltages are applied to the electronic controller 10 at step 1 in FIG. 5. Upon application of the operating voltages, the microcomputer 11 initializes internal registers, input and output ports and internal timers, and set up the input and the output interface 12, 13 such that the interface 12 is connected to these inputs and the interface 13 delivers output signal levels which are predetermined during a standby mode (step 2). At step 3, the microcomputer starts a timer Δt substantially at a given time interval, the timer being used to define a period for the processing operation. Various processing operations from a "sensor reading" routine (step 4) and continuing to an "output control" routine (step 800), or a wheel brake pressure control, is repeatedly executed substantially with the period Δt.

During the "sensor reading" routine (step 4), all information from input means such as sensors and switches or the like which are connected to the input interface 12 are read. Data which are used in the ABS control, 2-BDC control (which is a braking force distribution control covering rear two wheel brakes), TRC control and B-STR control (which is a braking force distribution control covering all the four wheels) are prepared in a "wheel speed calculation and wheel acceleration calculation" routine (step 100) and a "vehicle status estimation" routine (step 200). On the basis of such data prepared, "a control mode commencement/termination processing" routine (step 300) determines the need to commence, continue, or terminate each of various controls mentioned above. "ABS control" routine 400, "2-BDC control" routine 500, "TRC control" routine 600, and/or "B-STR control" routine 700 are executed in accordance with such decision to produce outputs (open/close or timing of solenoid valves) in order to operate individual wheel brake pressures. At "output control" routine 800, outputs to operate the various wheel brake pressures are adjusted in accordance with the priority of these controls to be delivered at output ports 13. In this manner, the solenoid valves are operated.

The individual subroutines will be described in detail below, but it may be helpful to list up major information referred to in the present embodiment, as follows:

| Information | Source of Information |
| --- | --- |
| actual yaw rate γ | detected by yaw rate sensor YA |
| wheel speed Vwi, | calculated from values detected |
| i = FR, FL, RR, RL | by wheel speed sensors 41 to 44 |
| (wheel speed VwFR | calculated from value detected |
| | by wheel speed sensor 41 |
| wheel speed VwFL | calculated from value detected |
| | by wheel speed sensor 42 |
| wheel speed VwRR | calculated from value detected |

-continued

| Information | Source of Information |
| --- | --- |
| wheel speed VwRL | by wheel speed sensor 43 calculated from value detected by wheel speed sensor 44) |
| fore-and-aft acceleration gx | detected by fore-and-aft acceleration sensor GX |
| lateral acceleration gy | detected by lateral acceleration sensor GY |
| front wheel steer angle θf | detected by steer angle sensor θF |
| rear wheel steer angle θr | detected by steer angle sensor θR |
| wheel braking applied or not | on/off of stop switch 45 |
| wheel acceleration DVwi, i = FR, FL, RR, RL (wheel acceleration DVwFR | calculated front values detected by wheel speed sensors 41 to 44 calculated from value detected by wheel speed sensor 41 |
| wheel acceleration DVwFL | calculated from value detected by wheel speed sensor 42 |
| wheel acceleration DVwRR | calculated from value detected by wheel speed sensor 43 |
| wheel acceleration DVwRL | calculated from value detected by wheel speed sensor 44) |
| estimated vehicle speed Vso | calculated on the basis of Vwi and DVwi |
| vehicle acceleration DVso | calculated on the basis of Vwi and DVwi |
| wheel slip rate Si, i = FR, FL, RR, RL (wheel slip rate S FR | calculated on the basis of Vwi and DVwi calculated on the basis of VwFR and VsoFR |
| wheel slip rate S FL | calculated on the basis of VwFL and VsoFL |
| wheel slip rate S RR | calculated on the basis of VwRR and VsoRR |
| wheel slip rate S RL | calculated on the basis of VwRL and VsORL) |
| coefficient of friction μ of running road surface | calculated on the basis of DVso and gy |
| vehicle body lateral slip angle β | calculated on the basis of γ, gyc, Vso |
| vehicle body lateral slip angular rate Dβ | Calculated on the basis of γ, gyc, Vso |

It is to be noted that in the description to follow, i=FR, FL, RR, RL may be denoted as "**: FR, FL, RR, RL".

Figure 6:
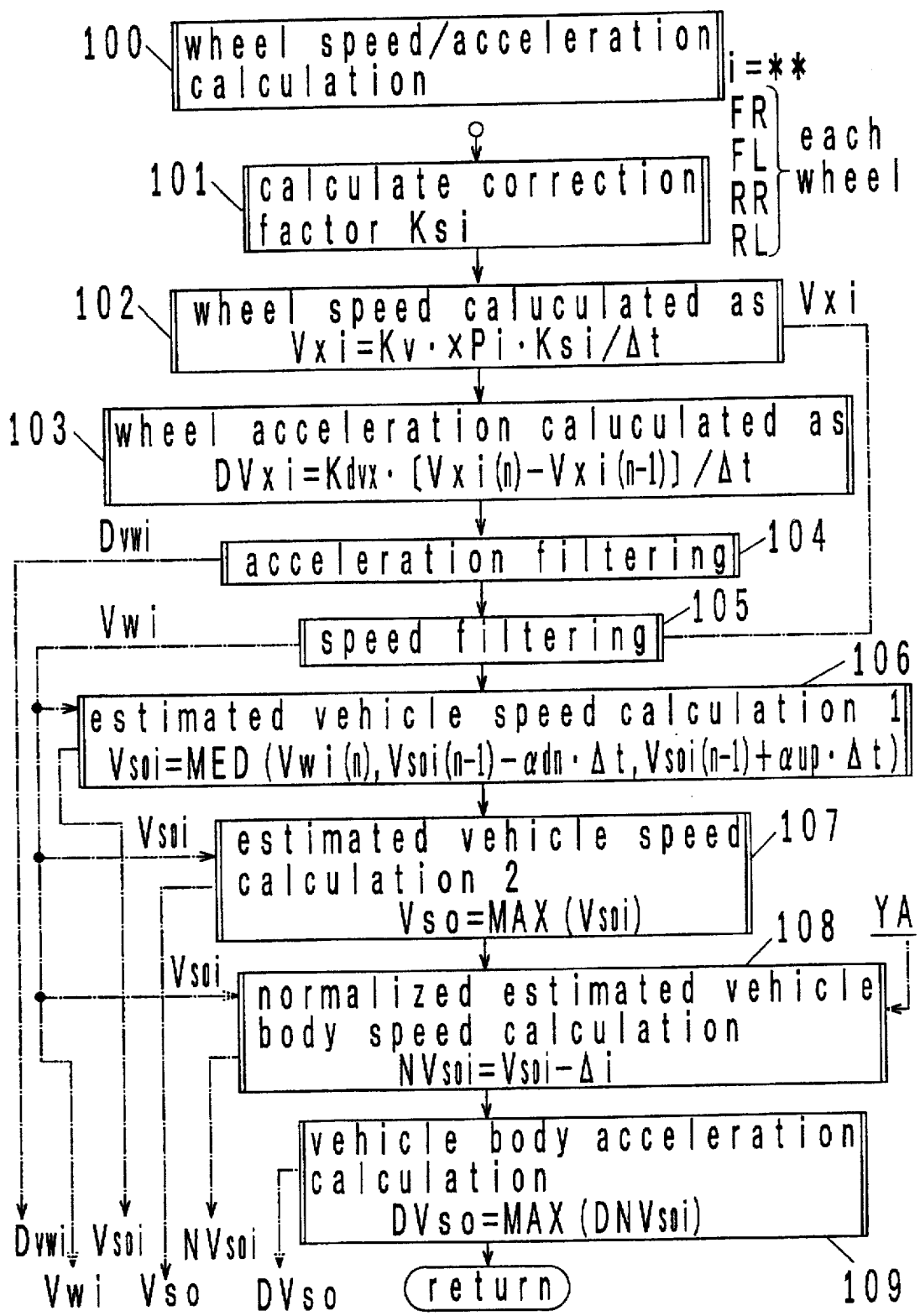
FIG. 6 is a flow chart showing "wheel speed calculation and wheel acceleration calculation" routine 100 shown in FIG. 5 in detail.

(1) "Wheel speed calculation and wheel acceleration calculation" routine 100 (FIG. 6)

The detail of this routine is shown in FIG. 6. During this routine, data in counter Pi is written into a register Pi while clearing the counter Pi. It is to be understood that the denotation "counter Pi" refers to four count registers including P FR, P FL, P RR and P RL. Hereafter "i" refers to one of four wheel brakes FR, FL, RR and RL, but it will be seen that because 2-BDC control and TRC control only covers the rear two wheels, in these controls, "i" refers to either RR or RL wheel brake. The counter Pi counts, by an interrupt operation, the number of oncoming electric pulses which are produced by each of the wheel speed sensors 41 to 44 and having a frequency which is proportional to the rotational speed or peripheral speed of each of the front-right, front-left, rear-right and rear-left wheels 51 to 54. For example, when the sensor 41 produces one pulse, the microcomputer 11 increments the content of the counter Pi (i=FR) by one, through an interrupt operation. In this manner, the content of the register Pi (i=FR) represents a number of pulses produced by the sensor 41 during a time interval of Δt and which is proportional to a wheel speed. A correction factor Ksi which takes a tire diameter of a wheel into consideration is calculated or determined at step 101. At step 102, each wheel speed Vwi is calculated by employing an LSB (least significant bit) forming correction factor, which is a constant. A formula used for this calculation is indicated in a block for the step 102 in FIG. 6.

Using a wheel speed Vwi(n) which is currently calculated and the previous wheel speed Vwi(n−1) which was calculated Δt before, the acceleration DVwi of each wheel is calculated at step 103. The calculated acceleration DVwi and the wheel speed Vwi are filtered to provide values DVwi and Vwi which are smoothed over a time sequence, and which are used as detected acceleration DVwi and detected wheel speed Vwi, and written into registers DVwi and Vwi, respectively, at steps 104 and 105.

At step 106, a vehicle body speed of each wheel Vsoi is calculated, which is an estimated vehicle body speed for each wheel location. A median value Vsoi of three items, including the current value Vwi(n) of the wheel speed, a value Vsoi(n−1)−αdn·Δt which is the previously calculated vehicle body speed Vsoi(n−1) from which a speed reduction αdn·Δt, occurring during a time interval of Δt at a given deceleration is subtracted, and a value Vsoi(n−1)+Δup·Δt, which is the previously calculated vehicle body speed Vsoi (n−1) to which a speed increase αup·Δt, occurring during a time interval of Δt at a given acceleration, is added, is calculated. This median value is chosen as a vehicle body speed Vsoi, which is then written into a register Vsoi. One of the vehicle body speeds Vsoi for four wheels, which is at maximum is chosen as a vehicle body speed Vso for the entire vehicle, which is then written into a register Vso at step 107.

When a vehicle is turning, a deviation Δi of vehicle body speed Vsoi for each wheel location relative to a speed of the vehicle body in the vehicle travelling direction at each wheel location is calculated, in a manner corresponding to a deviation of the orientation of a wheel relative to the travelling direction of the vehicle, according to a lateral acceleration gy (or yaw rate γ may be employed) to correct the vehicle body speed Vsoi for each wheel location, and a corrected value NVsoi=Vsoi−Δi is written into a register NVsoi as a normalized vehicle body speed for each wheel location, at step 108. A normalized vehicle body acceleration DNVsoi for each wheel location is then calculated using the currently calculated normalized vehicle body speed NVsoi (n) and the previous normalized vehicle body speed NVsoi (n−1) which was calculated Δt before, and the maximum one of four such accelerations is chosen as a vehicle body acceleration DVso for the entire vehicle, which is written into a register DVso at step 109. This represents what is commonly referred to as "vehicle body acceleration".

Figure 7:
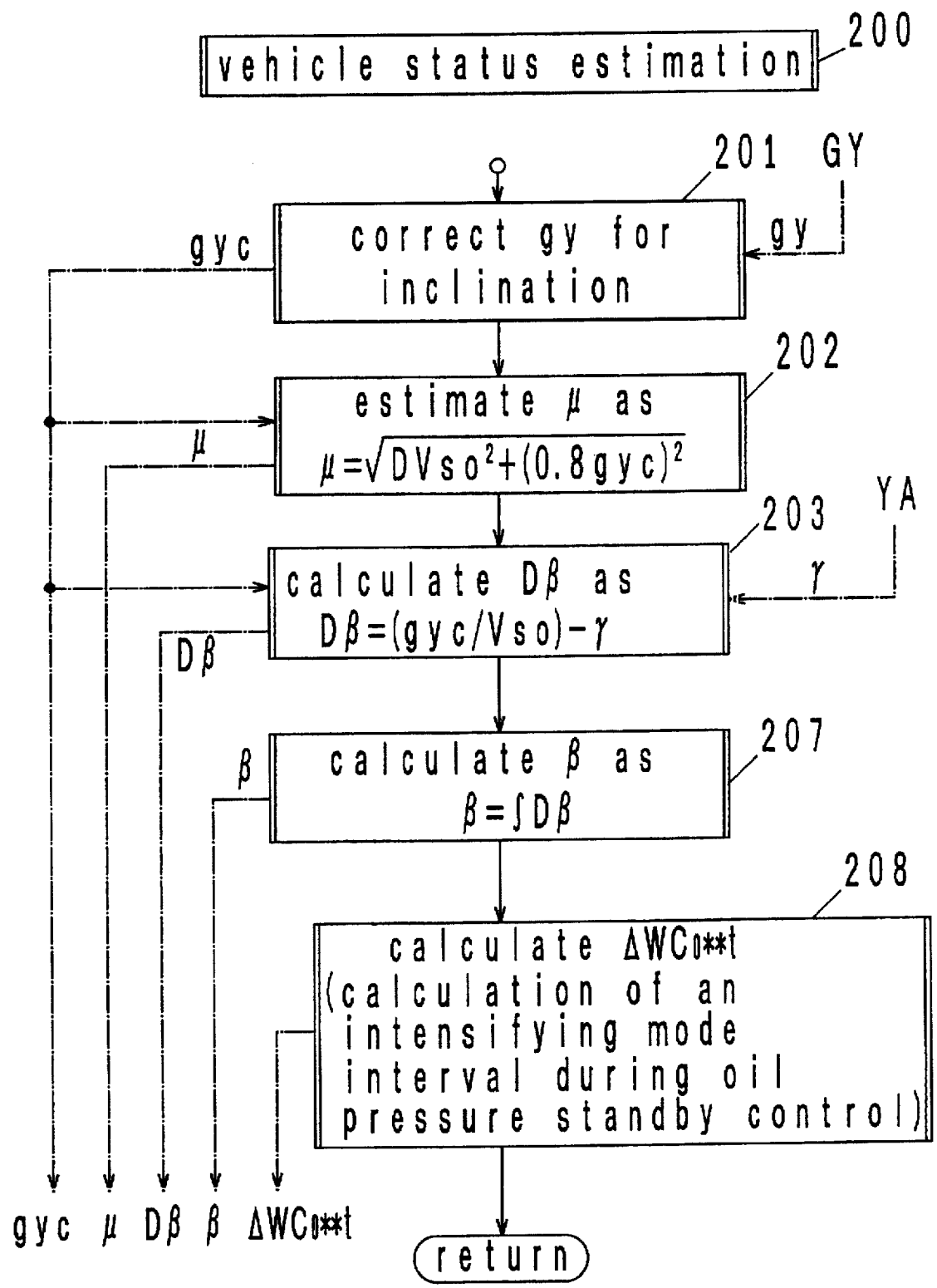
FIG. 7 is a flow chart showing "vehicle status estimation" routine 200 shown in FIG. 5 in detail.

(2) "Vehicle status estimation" routine 200 (FIG. 7)

In this routine shown in FIG. 7, a lateral acceleration gy detected by a sensor is used to calculate a true lateral acceleration gyc in which an inclination of the vehicle in the lateral direction is corrected, and the true lateral acceleration is written into a register gyc at step 201. A coefficient of friction μ of a road surface is then estimated and is written into a register μ at step 202. A formula used for this calculation is indicated in a block for the step 202. A lateral slip angular rate Dβ and a lateral slip angle β are calculated in a manner indicated below, and are written into registers Dβ and β at steps 203 and 207, respectively:

$$D\beta = (gyc/Vso) - \gamma \tag{1}$$

$$\beta = \int D\beta \tag{2}$$

Figure 16:
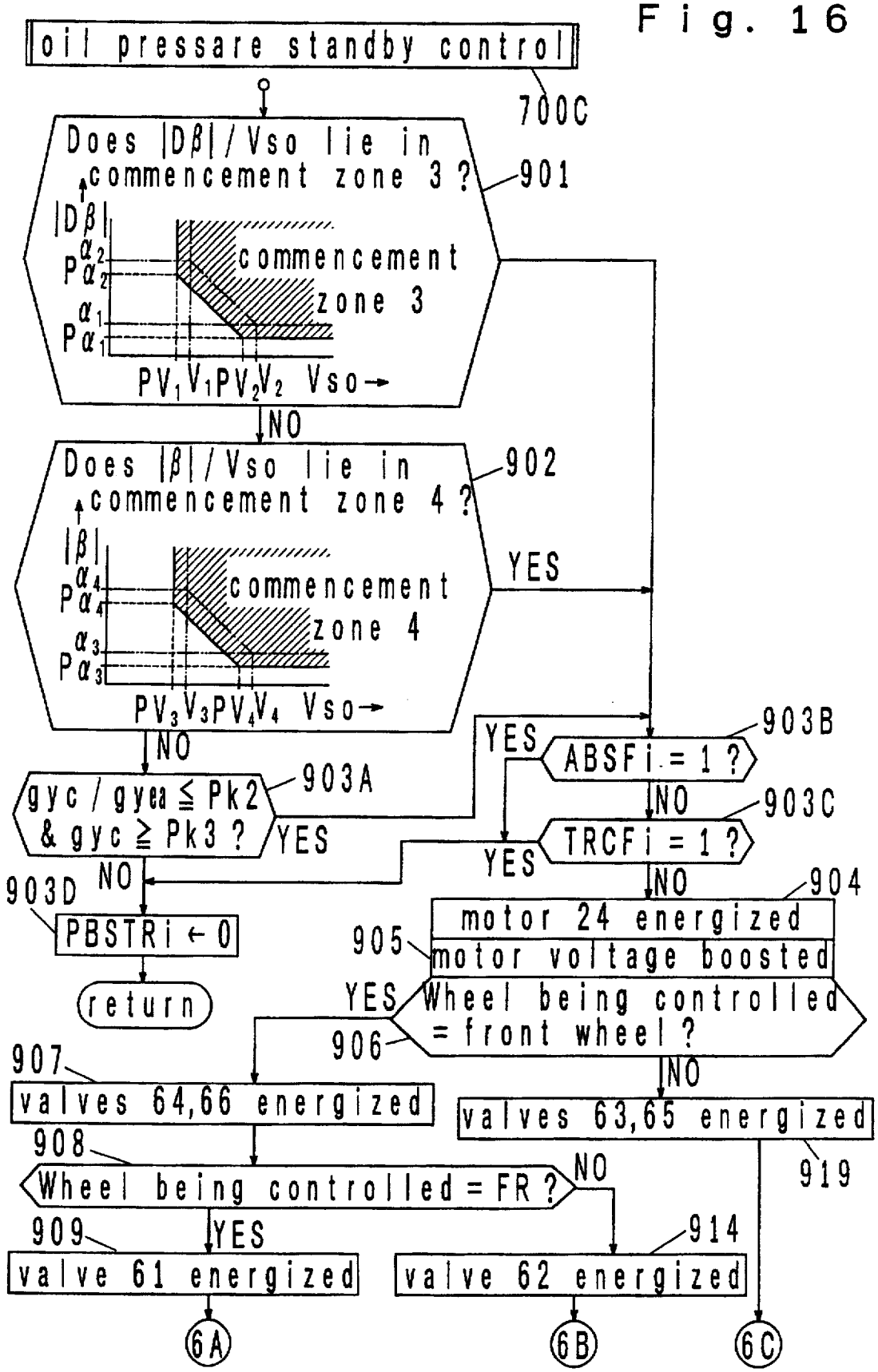
FIG. 16 is a flow chart of part of "oil pressure standby" subroutine 700C shown in FIG. 11.

Then an initial intensification interval ΔWCo**t is calculated at step 208. The detail of such calculation will be described in a subsequent paragraph (4C) "oil pressure standby control" subroutine 700C (FIG. 16).

Figure 8:
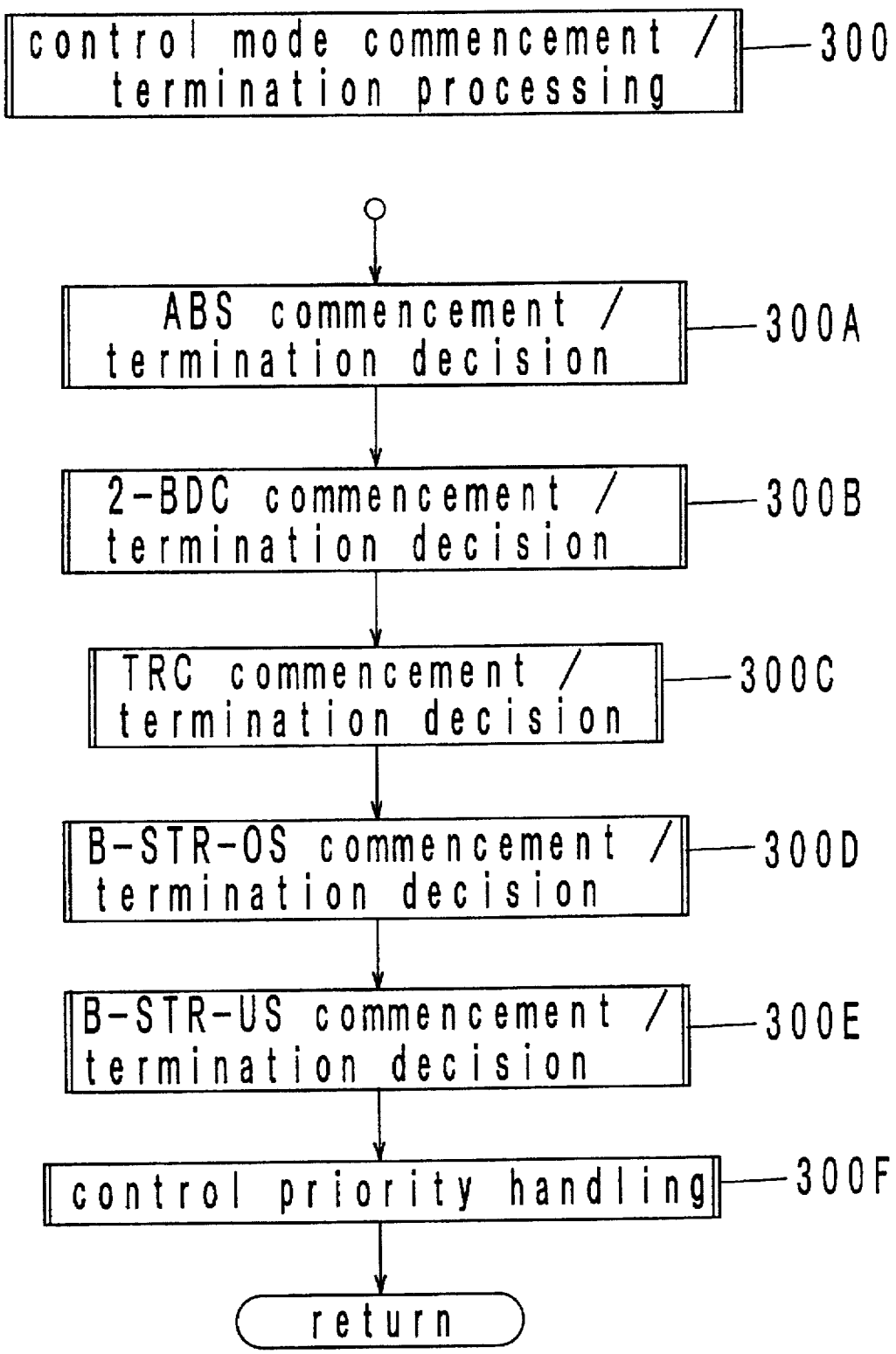
FIG. 8 is a flow chart of "control mode commencement/termination processing" routine 300 shown in FIG. 5 in detail.

(3) "Control mode commencement/termination processing" routine 300 (FIG. 8)

In this routine shown in FIG. 8, an "ABS commencement/termination decision" subroutine 300A examines if there is a need to commence an ABS control or a brake pressure control which prevents a wheel lock when a wheel is being braked for each of the four wheels FR, FL, RR and RL brakes 51 to 54 when the ABS control has not yet been commenced (ABSFi=0; ABSF=0). If the need for the ABS control is found to exist for any one of the wheel brakes, "1" is written into a register ABSF. If the ABS control has already been commenced for each of the wheel brakes 51 to 54 (ABSFi=1), this subroutine examines if there is a need to terminate such control. If the ABS control for any one of the wheel brakes is found unnecessary, "0" is written into a register ABSFi, and if a need for the ABS control is denied for all the wheel brakes, "0" is written into the register ABSF, thus clearing it.

At "2-BDC commencement/terminaton decision" subroutine 300B which follows, if a braking force distribution control covering the wheel brakes 53 and 54 associated with the wheels RR and RL or 2-BDC control has not yet been commenced (BDCFi=0; BDCF=0), the need to commence such control is examined for each of the wheel brakes 53 and 54. If a need for 2-BDC control is found to exist, "1" is written into registers BDCFi and BDCF. When 2-BDC control has already been commenced for each of the wheel brakes 53 and 54 (BDCFi=1), the need to terminate such control is examined. If it is found that 2-BDC control for the respective wheel brakes is unnecessary, "0" is written into the register BDCFi. When 2-BDC control is found unnecessary for both of the wheel brakes, "0" is written into the register BDCF, thus clearing it.

At "TRC commencement/termination decision" subroutine 300C, if the TRC control, namely, a wheel brake pressure control which reduces an acceleration slip, has not been commenced (TRCFi=0), the need to commence such control is examined for each the brakes 53, 54 associated with the rear two wheels RR, RL. If the need is found to exist for each wheel, "1" is written into a register TRCFi. If the need for the TRC control is found to exist for any one wheel, "1" is written into a register TRCF. When the TRC control has been commenced (TRCFi=1; TRCF=1), the need to terminate such control is examined. If the need is denied for each wheel brake, "0" is written into the register TRCFi. If the need is denied for all of the wheel brakes, "0" is written into the register TRCF, thus clearing it.

Figure 9:
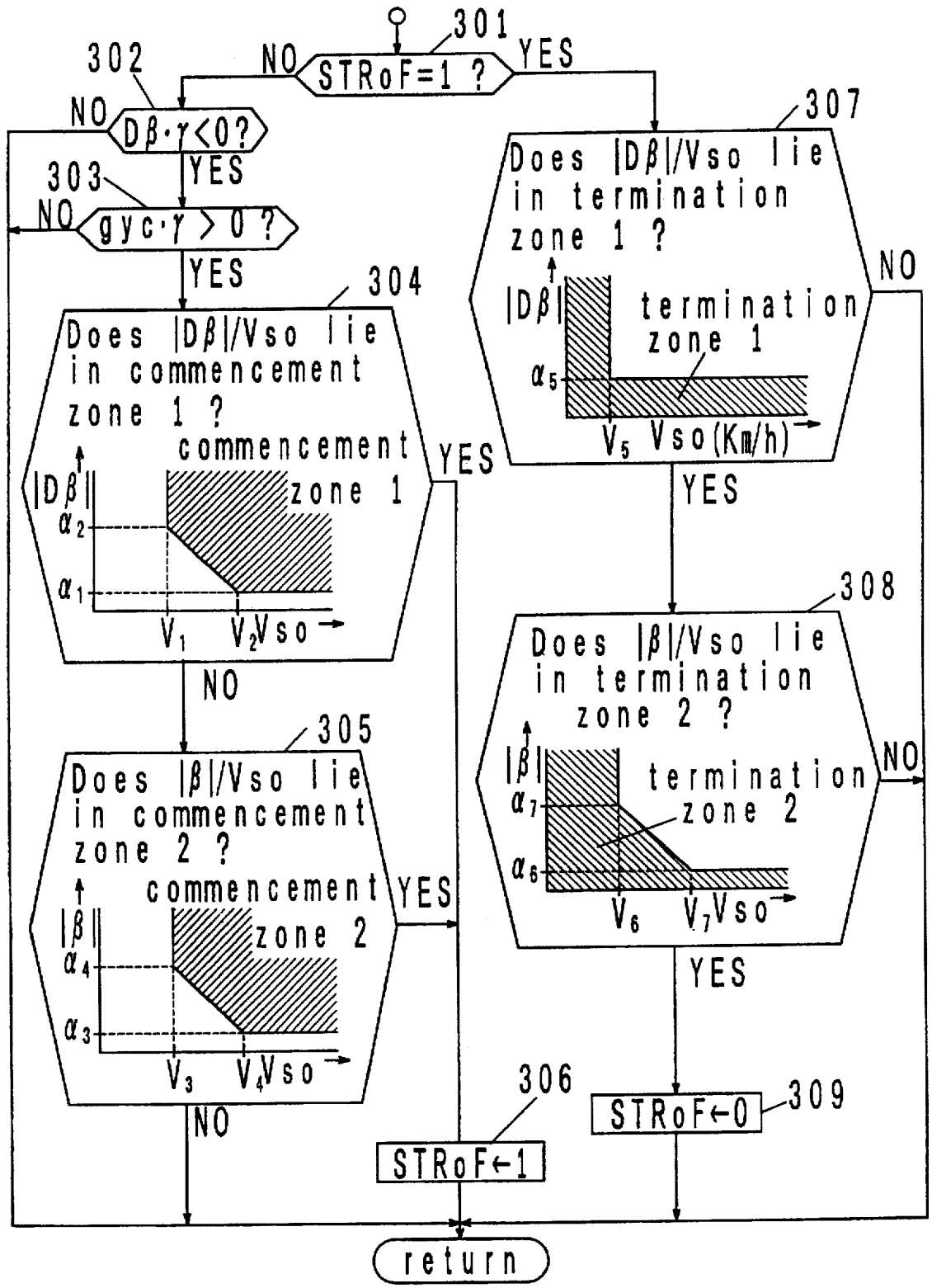
FIG. 9 is a flow chart of "B-STR-OS commencement/termination decision" subroutine 300D shown in FIG. 8 in detail.

Subsequently, B-STR-OS commencement/termination decision" subroutine 300D shown in FIG. 9 is executed. Initially, it is examined if a braking force distribution control covering four wheel brakes or B-STR-OS control which is intended to suppress an over-steer has been or has not been commenced (STRoF=1 or 0) at step 301. If the control has not been commenced, it is then examined if the operation is directed toward the over-steer direction at steps 302 and 303. This takes place by seeing if Dβ·γ<0, indicating that the lateral slip angular rate Dβ and the yaw rate γ are of opposite polarities, and gyc·γ>0, indicating that the lateral acceleration gyc and the yaw rate γ are of similar polarities. If it is found that the operation is directed toward the over-steer, or that Dβ·γ<0 and gyc·γ>0, a combination of the vehicle body speed Vso and the lateral slip angular rate Dβ is examined if it lies in a commencement zone 1, which is shown in a block for the step 304 in FIG. 9. Specifically, it is examined if the vehicle body speed Vso is high (Vso≧V$_1$~V$_2$) and the lateral slip angular rate Dβ is high (the absolute magnitude of Dβ≧α$_1$~α$_2$), indicating a tendency toward the over-steer. If so, a decision is rendered that there is a need for B-STR-OS control, and "1" is written into a register STRoF at step 306. If a different decision is rendered that there is no tendency toward increasing the over-steer, the existence of an excessive over-steer which already occurred is examined at step 305. Specifically, it is examined if the vehicle body speed Vso is high (Vso≧V$_3$~V$_4$) and the lateral slip angle β is high (the absolute magnitude of β≧α$_3$~α$_4$), thus meaning that the operation is in a commencement zone 2 shown in a block for the step 305 in FIG. 9. If so, a decision is rendered that there is a need for B-STR-OS control, and "1" is written into a register STRoF at step 306.

When B-STR-OS control has already been commenced (STRoF=1), it is examined if a combination of the vehicle body speed Vso and the lateral slip angular rate Dβ lies in a termination zone 1 shown in a block for the step 307 in FIG. 9. At step 307, it is examined if the vehicle body speed Vso is low (Vso<V$_5$) or if the lateral slip angular rate Dβ is low (the absolute magnitude of Dβ<α$_5$). If so, then, an examination is made to see if the vehicle body speed Vso is low (Vso<V$_6$~V$_7$) or the lateral slip angle β is low (the absolute magnitude of β<α$_6$~α$_7$) or if the combination lies in a termination zone 2 indicated in a block for the step 308 in FIG. 9. When the answer is in the affirmative, a decision is rendered that B-STR-OS control is unnecessary, and "0" is written into register STRoF at step 309.

Figure 10:
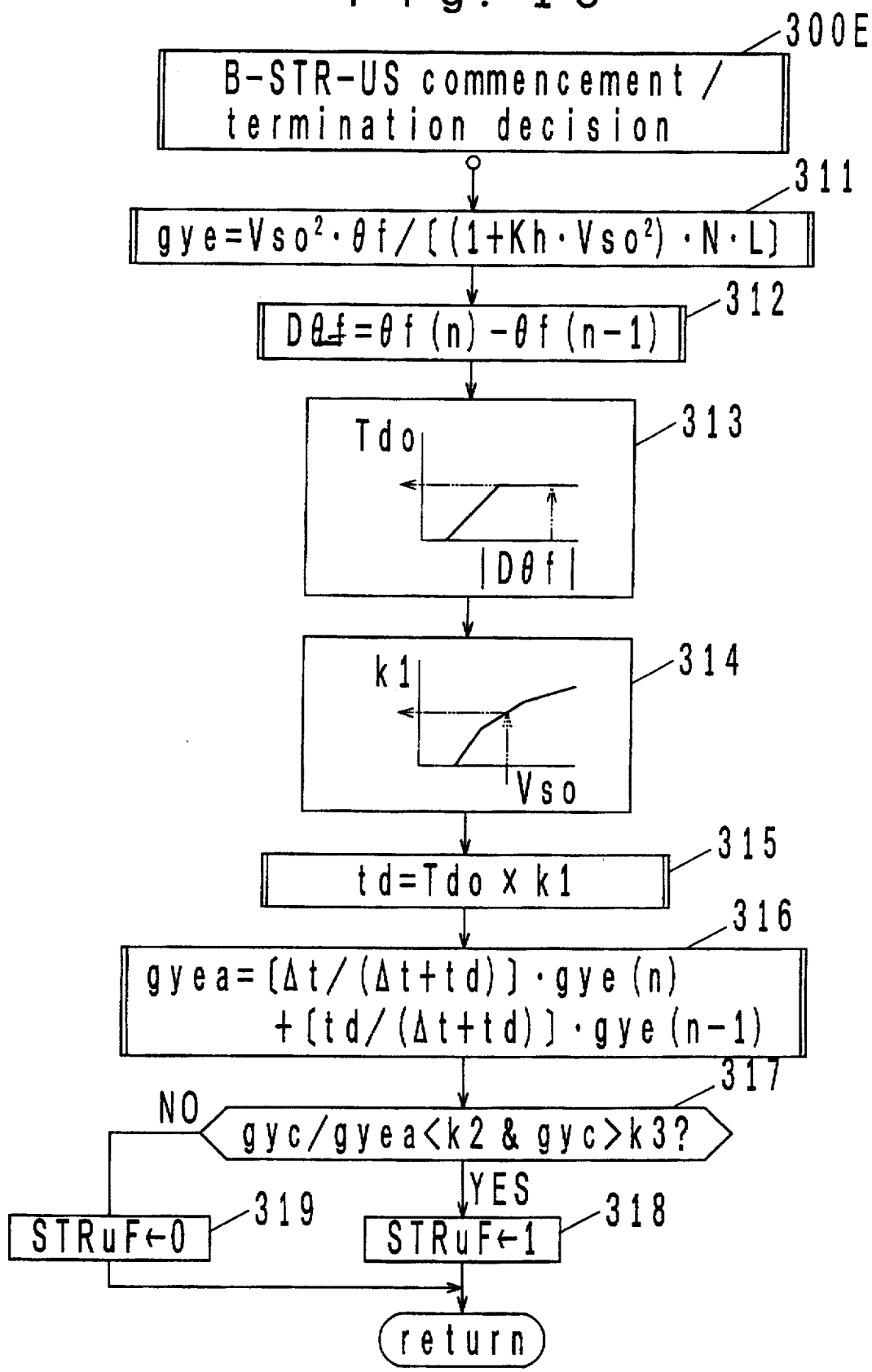
FIG. 10 is a flow chart showing "B-STR-US commencement/termination decision" subroutine 300E shown in FIG. 8 in detail.

Then follows the execution of "B-STR-US commencement/termination decision" subroutine 300E, the detail of which is shown in FIG. 10. Here, a lateral acceleration gye expressed in terms of the current front wheel steer angle θf and the vehicle body speed Vso is calculated or estimated as follows (step 311):

$$gye = Vso^2 \cdot \theta f / [(1 + Kh \cdot Vso^2) \cdot N \cdot L] \qquad (3)$$

where N represents an overall steering ratio, L a wheel base and Kh a stability factor.

Then, a front wheel steering angular rate Dθf=θf(n)−θf(n−1) is calculated at step 312. θf(n) represents a front wheel steering angle θf which is written into currently, and θf(n−1) a corresponding angle θf which was written into previously (Δt before). A time delay Tdo corresponding to the steering angular rate Dθf and a delay factor k$_1$ corresponding to the vehicle body speed Vso are read from memories at steps 313,314, and a delay time is calculated (or estimated) as td=Tdo×k$_1$ at step 315. Based on the delay time td, period Δt of calculation or sampling, the lateral acceleration gye(n) which is currently calculated at step 311 and the lateral acceleration gye(n−1) which was calculated previously (Δt before), a current likely lateral acceleration gyea is calculated or estimated as follows:

$$gyea = [\Delta t/(\Delta t+td)] \cdot gye(n) + [td/(\Delta t+td)] \cdot gye(n-1) \qquad (4)$$

at step 316. It is then determined at step 317 if a ratio gyc/gyea of the actual lateral acceleration gyc with respect to the lateral acceleration gyea which is estimated from the steering angle θf and the vehicle body speed Vso is less than a given value k2 and if the actual lateral acceleration gyc exceeds another given value k3. (While the actual lateral acceleration gyc exists, the actual lateral acceleration gyc may be low relative to a lateral acceleration gyea which should result from a steering operation, and this represents an under-steer.) If so, "1" is written into register STRuF, and otherwise, "0" is written into register STRuF (steps 318 and 319).

Returning to FIG. 8, upon completion of the execution of "B-STR-US commencement/termination decision" subroutine 300E, the computer 11 then executes "control priority handling" subroutine 300F. As mentioned, a commencement/termination decision is rendered for each of ABS control, 2-BDC control, TRC control, B-STR-OS control and B-STR-US control, and if any one of these controls is required, "1" is written into a corresponding one of registers ABSF, BDCF, TRCF, STRoF and STRuF. However, if registers STRoF and STRuF contain "1", it does not follow that B-STR control (decompression, holding and intensification) takes place with every one of the four wheel brakes, and a particular wheel brake to which B-STR control is applied is determined by "B-STR control" routine 700.

In this embodiment, the highest priority is given to "ABS control" routine 400, and the sequentially descending priority is given to "2-BDC control" routine 500 and "TRC control" routine 600. In the "control priority handling" subroutine 300F, the "2-BDC control" routine 500 and the "TRC control" routine 600 are inhibited, by clearing the registers BDCF and TRCF, during the execution of the "ABS control" routine 400 (when ABSF=1). During the execution of "2-BDC control" routine 500 (when BDCF=1), the "TRC control" routine 600 is inhibited, by clearing register TRCF. It is to be noted that the "B-STR control" routine 700 is executed independently from other controls.

In each of "ABS control" routine 400, "B-STR control" routine 700, "2-BDC control" subroutine 500 and "TRC control" routine 600, on the basis of values detected by the sensors YA, θF, θR, GX and GY, values calculated in the "wheel speed calculation and wheel acceleration calculation" routine 100 and "wheel status estimation" routine 200, a wheel to be controlled (namely, a particular wheel brake, the braking pressure of which is to be controlled) is determined, and a target slip rate Soi and an actual slip rate (estimated value) is calculated for each wheel being controlled, and on the basis of these, a deviation Esoi of the slip rate is calculated. On the other hand, a deviation EDi of a wheel acceleration relative to a reference acceleration is calculated, and the determination is made to see if a combination of the deviation Esoi of slip rate and a deviation EDi of the wheel acceleration lies in which one of (1) a rapid decompression zone, (2) a pulse decompression zone, (3) holding zone, (4) a pulse intensification zone and (5) a rapid intensification zone, all of which are predetermined. A particular mode (rapid decompression, pulse decompression, holding, pulse intensification or rapid intensification) in which the brake pressure of a wheel being controlled is to be controlled is determined accordingly. In addition, an intensification/decompression compensation which compensates for a lag in intensification or decompression during such brake pressure control, an initial specific mode calculation which is intended to smooth out a fluctuation in a brake pressure upon commencing a brake pressure control, and a termination specific mode calculation which is intended to smooth out a fluctuation in a brake pressure when terminating a brake pressure control are executed. The logic of these operations are common, in principle, to all of "ABS control" routine 400, "B-TRC control" routine 700, "2-BDC control" routine 500 and "TRC control" routine 600. However, because these controls involve different functions, the selection of a wheel being controlled, a brake pressure control mode which corresponds to the deviation Esoi of slip rate and the deviation EDi of a wheel acceleration, and constants used in the calculation are different between these controls. Since the logic is generally similar, the "B-STR control" routine 700 will be described in detail below.

Figure 11:
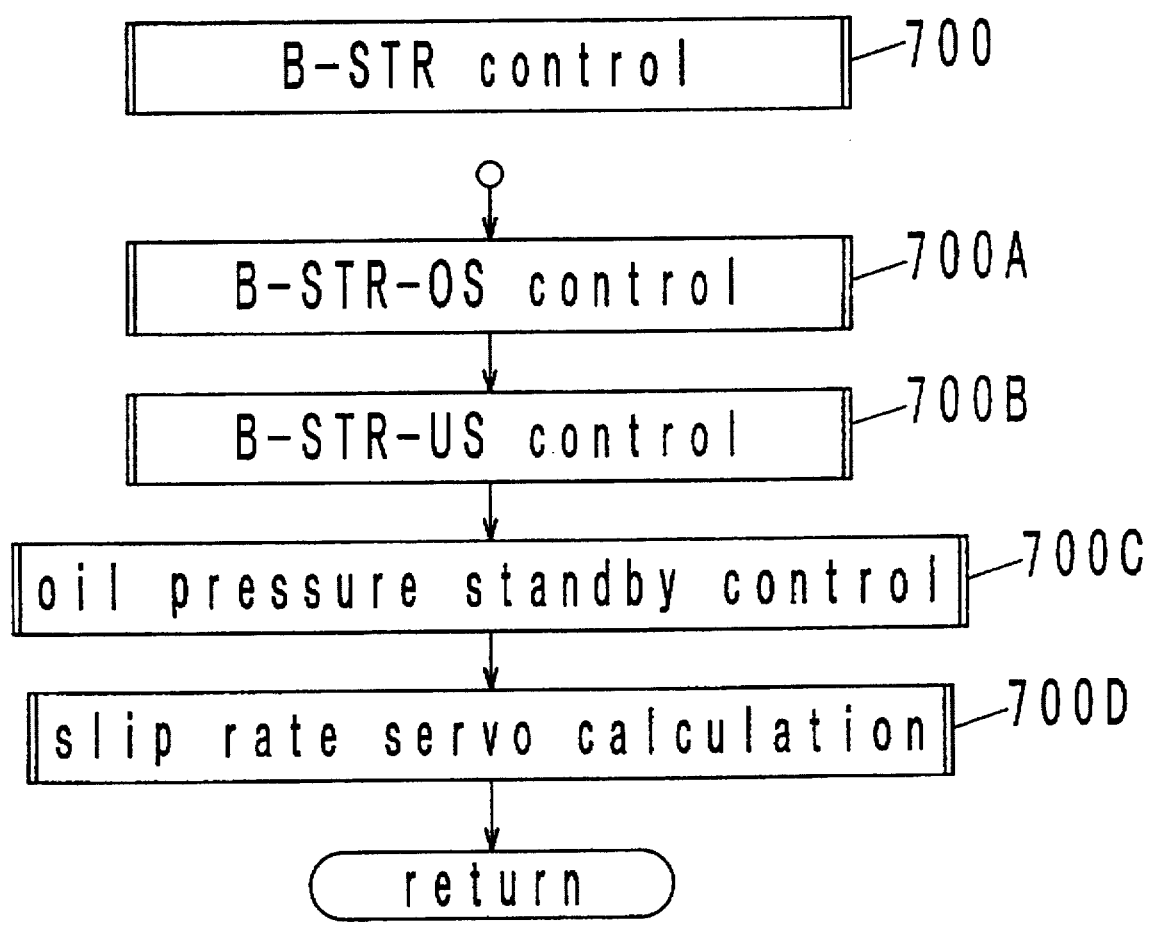
FIG. 11 is a flow chart showing "B-STR control" routine 700 shown in FIG. 5 in detail.

(4) "B-STR control" routine 700 (FIG. 11)

This routine includes "B-STR-OS control" subroutine 700A, "B-STR-US control" subroutine 700B and "slip rate servo calculation" subroutine 700C, which are executed in the sequence named.

Figure 12:
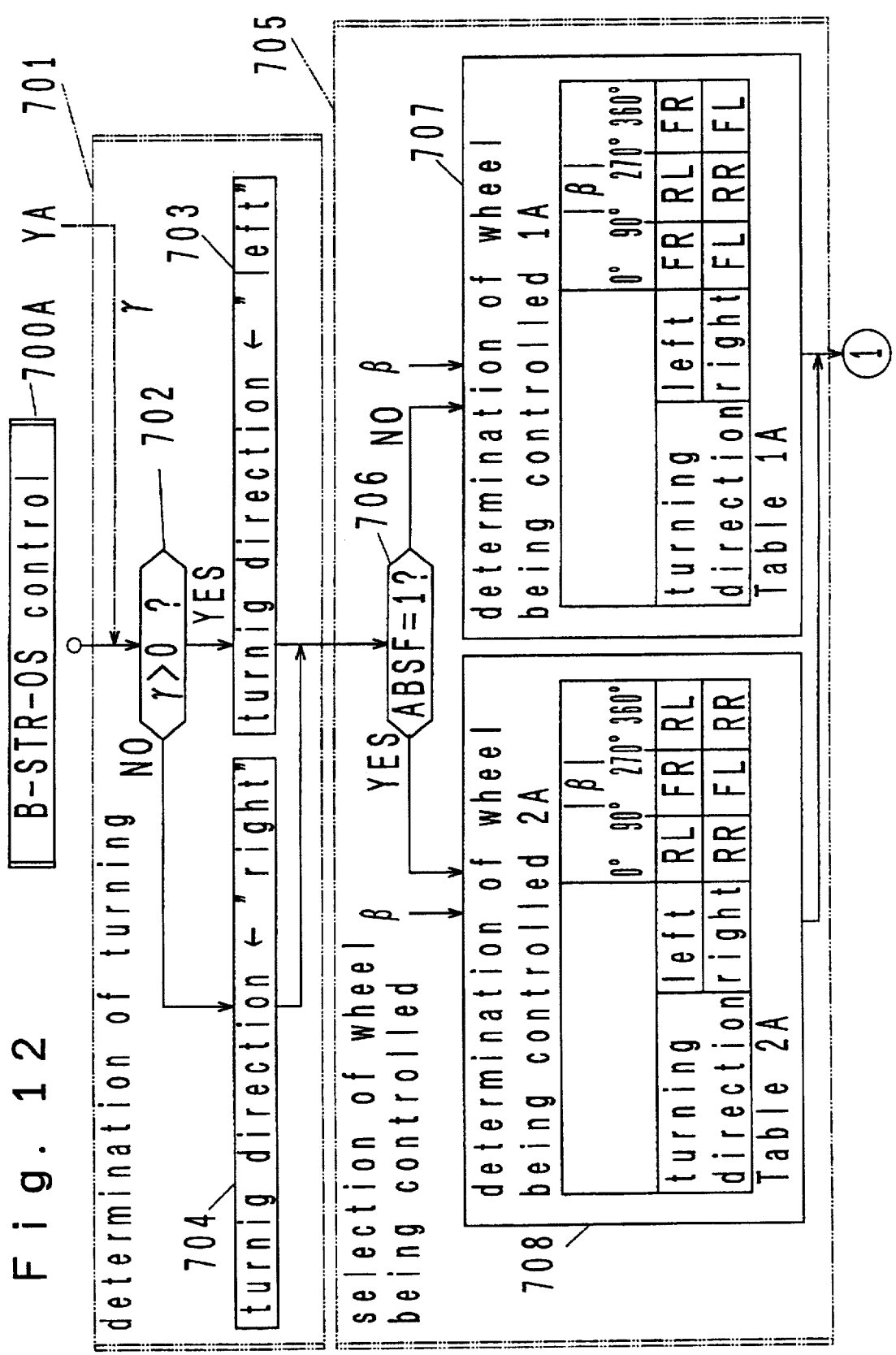
FIG. 12 is a flow chart of part of "B-STR-OS control" subroutine 700A shown in FIG. 11.
Figure 13:
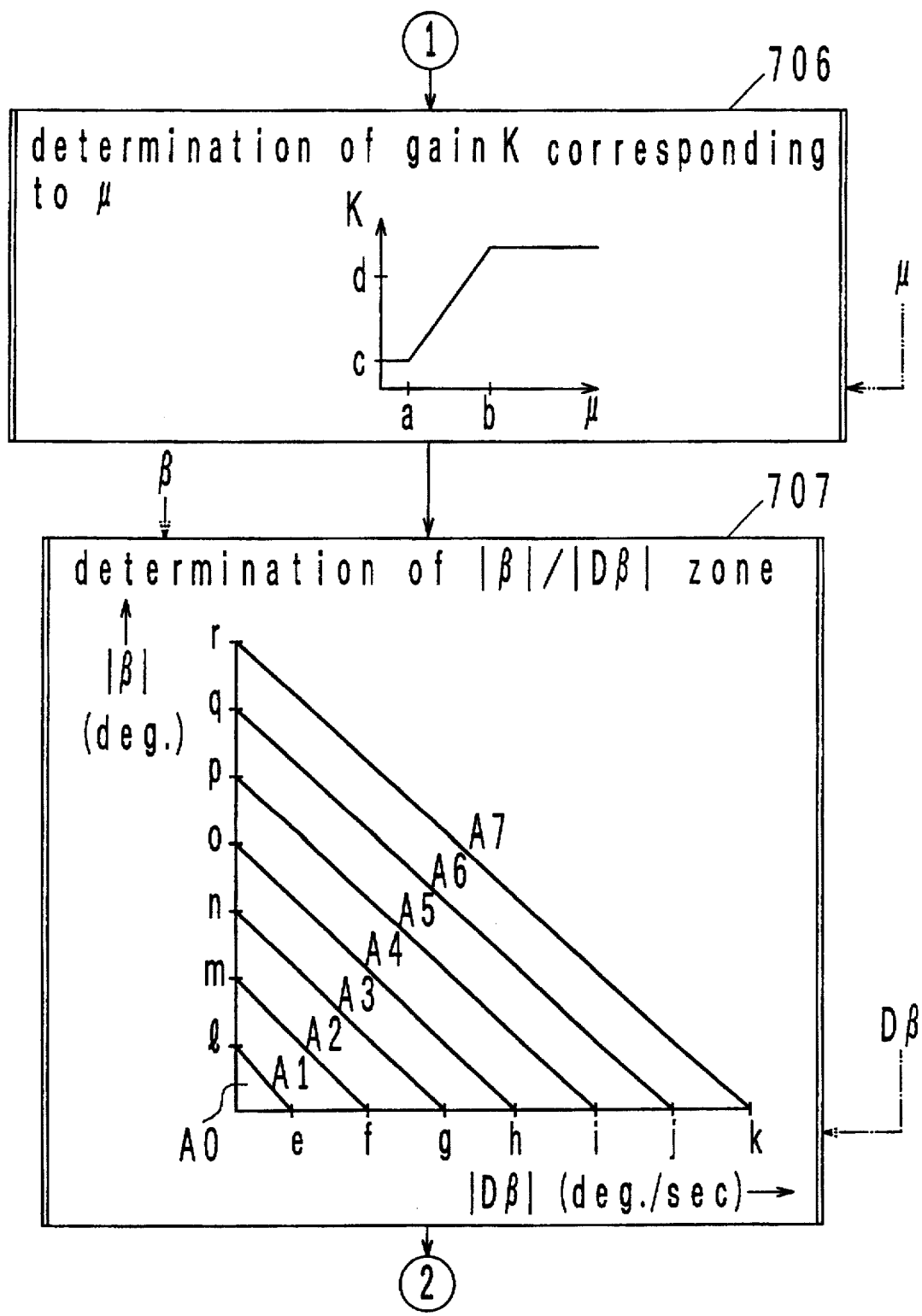
FIG. 13 is a flow chart of part of "B-STR-OS control" subroutine 700A shown in FIG. 11.
Figure 14:
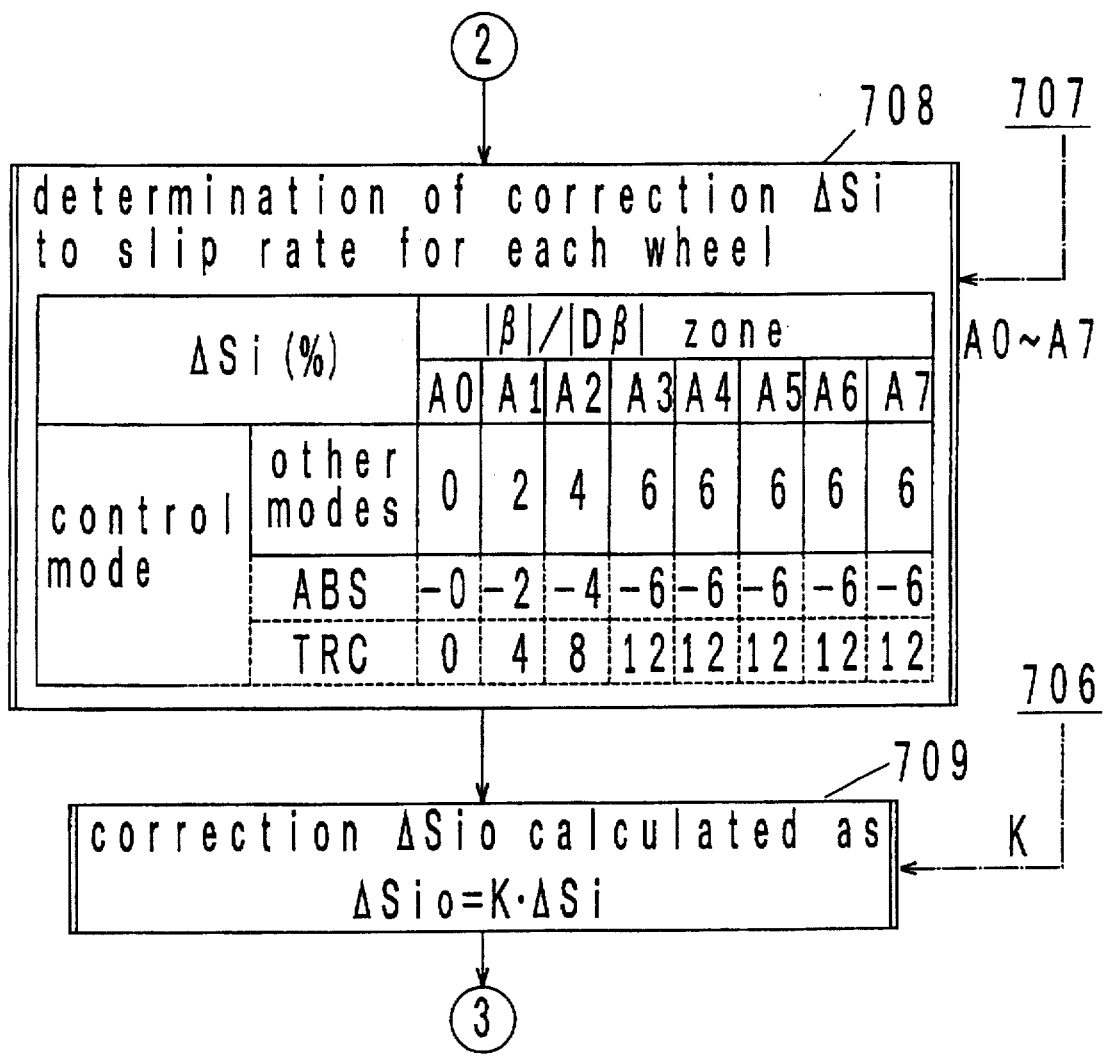
FIG. 14 is a flow chart of another part of "B-STR-OS control" subroutine 700A shown in FIG. 11.

(4A) "B-STR-OS control" subroutine 700A (FIGS. 12 to 14)

Initially referring to FIG. 12, a direction in which the vehicle turns is determined by referring to the yaw rate γ and data representing direction of turning is written into turning direction register at steps 701 to 704. In this embodiment, the positive polarity of the yaw rate corresponds to a left turn while the negative polarity corresponds to a right turn. An examination is then made to see if it is now in the ABS control (ABSF=1) at step 706.

If it is now in the ABS control, a wheel brake, the brake pressure of which is to be controlled, is determined in a manner indicated in a block for step 708 in FIG. 12 in accordance with the absolute magnitude of the lateral slip angle β and the direction of turning (indicated by data contained in turning direction register). For example, when the vehicle is turning to the left and if the absolute magnitude of the lateral slip angle β is less than 90°, the wheel RL is determined as one, the brake pressure of which is to be controlled (or more exactly, the wheel brake 54 is determined to be controlled). If the absolute magnitude of β is equal to or greater than 90° and less than 270°, the wheel FR is determined to be one, the brake pressure of which is to be controlled (or more exactly, the wheel brake 51 is determined to be controlled). If the absolute magnitude of β is equal to or greater than 270° and less than 360°, the wheel RL is determined to be one, the brake pressure of which is to be determined (or the wheel brake 54 being controlled).

If it is now not in the ABS control (indicated by ABSF=0), a wheel (or a wheel brake), the brake pressure of which is to be controlled, is determined in a manner indicated in a block for step 707 in FIG. 12 in accordance with the absolute magnitude of the lateral slip angle β and the turning direction (indicated by data contained in the turning direction register). For example, if the vehicle is turning to the left, if the absolute magnitude of the lateral slip angle β is less than 90°, the wheel FR is determined to be one, the brake pressure of which is to be controlled (or wheel brake 51 being controlled). If the absolute magnitude of β is equal to or greater than 90° and less than 270° the wheel RL is determined to be one, the brake pressure of which is to be controlled (or exactly the wheel brake 54 being controlled). If the absolute magnitude of β is equal to or greater than 270° and less than 360° the wheel FR is determined to be one the brake pressure of which is to be controlled (or the wheel brake 51 being controlled).

As shown at step 207 in FIG. 12, if $0°≦|β|<90°$ and $270°≦|β|<360°$ (meaning that the vehicle is oriented forwardly with respect to its actual travelling direction), the front wheel brakes FR, FL are specified as being controlled, and the associated wheel brake pressures are intensified. If $90°≦|β|<270°$ (meaning that the vehicle is oriented laterally or rearwardly with respect to its actual forwarding direction), the rear wheel brakes RL, RR are specified as being controlled (the wheel brake pressures being intensified). If $0°≦|β|<90°$ and $270°≦|β|<360°$, a spin moment of a vehicle is suppressed in a similar manner as in the prior art (see Disclosed Japanese Patent Application No.

500,868/1991), effectively suppressing an abnormal turning or spinning of the vehicle. In a conventional arrangement, such abnormal turning or spinning will be exacerbated if $90°≤|β|<270°$, but according to the present embodiments, increasing the rear wheel brakes (or the wheel brakes which are located forwardly with respect to the actual travelling direction of the vehicle) is effective to suppress the spin moment again, thus effectively suppressing an abnormal turning or spinning of the vehicle.

Concerning the selection of the wheel being controlled (step 707), it is to be understood that one of the purposes of the ABS control while a braking operation is conducted by a driver is to secure a steerability. During the ABS control, if a wheel brake pressure is intensified as a result of B-STR-OS control, a further braking effort cannot be obtained from that wheel, resulting in an adverse effect. Accordingly, during the B-STR-OS control which occurs during the ABS control, instead of the wheel brake which is to be intensified, one of the wheel brakes which is located diametrically opposite to the wheel brake to be intensified is decompressed.

To give an example, when the ABS control is not specified (ABSF=0), the step 707 determines that the wheel to be subject to B-STR-OS control be the front wheel FR/FL (or more exactly, its associated wheel brake) if $0°≤|β|<90°$ and $270°≤|β|<360°$ and be the rear wheel RL/RR if $90°≤|β|<270°$. When the ABS control is specified (ABSF= 1), the rear wheel RL/RR is the wheel, the brake pressure of which is to be controlled, if $0°≤|β|<90°$ and $270°≤|β|<360°$, and the front wheel brake FR/FL is to be controlled if $90°≤|β|<270°$, whereby a matching between the ABS control and the B-STR-OS control is accomplished.

Referring to FIG. 13, after having determined a wheel, the brake pressure of which is to be controlled, a gain K corresponding to a coefficient of friction μ of the road surface (data stored in register μ) is read from a memory and is saved in a register at step 706, and at next step 707, it is determined if a combination of the absolute magnitude of the lateral slip angular rate Dβ and the absolute magnitude of the lateral slip angle β lies in which one of zones A0 to A7 shown in a block for the step 707. Referring to FIG. 14, a slip rate correction ΔSi (%) for each wheel which is allocated to a zone Aj (j=0 to 7) is read from a memory at step 708. The slip rate deviation target value ΔS (%) used in the "B-STR control" routine 700 and the "2-BDC control" routine 500 includes a slip rate correction ΔSi (%) equal to j for each zone Aj, as indicated in a block for the step 708 in FIG. 14. This block also indicates a slip rate correction Si (%) which is allocated for each zone Aj in the "ABS control" routine 400 and the "TRC control" routine 600. The microcomputer 11 then multiplies the slip rate correction ΔSi (%) corresponding to a zone Aj by a gain K corresponding to μ which is obtained at step 706 (FIG. 13), thereby calculating a slip rate correction ΔSio=K·ΔSi at step 709.

Figure 15:
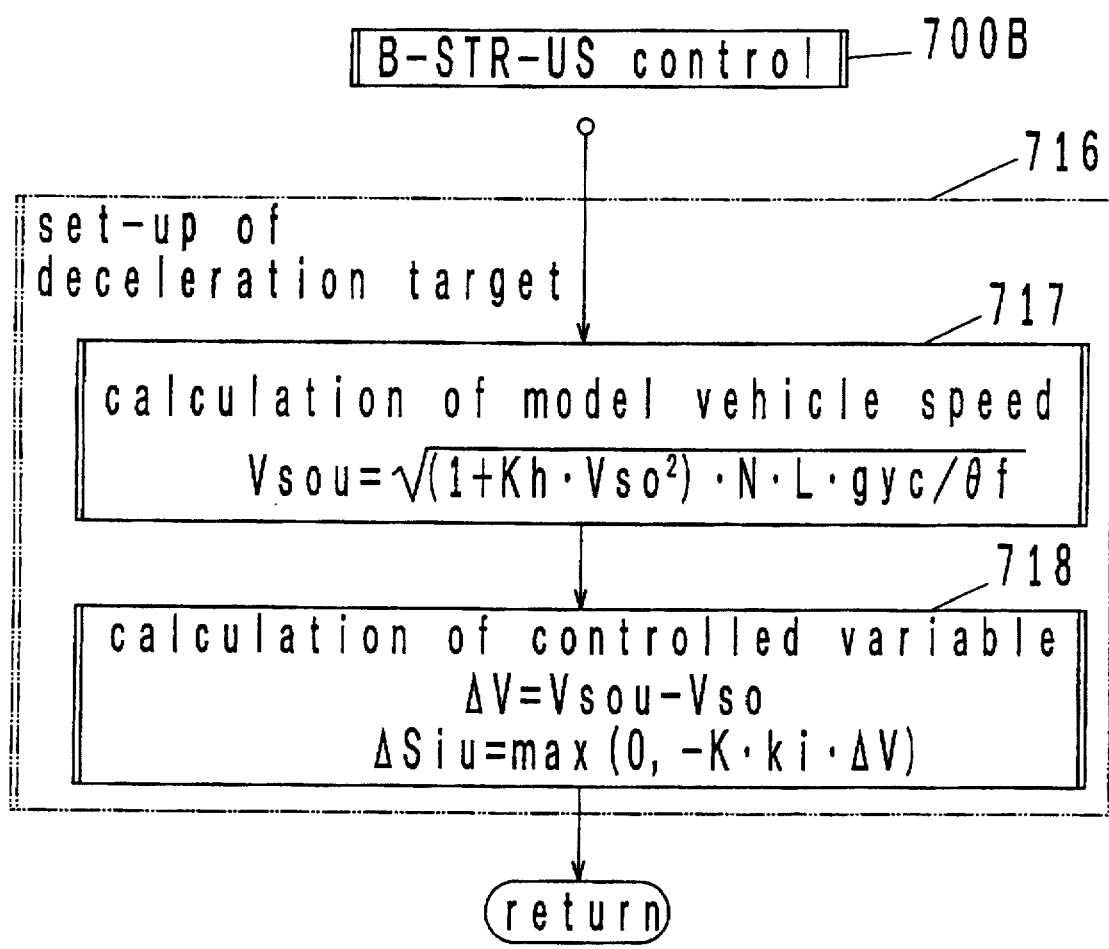
FIG. 15 is a flow chart of "B-STR-US control" subroutine 700B shown in FIG. 11 in detail.

(4B) "B-STR-US control" subroutine 700B (FIG. 15)

The microcomputer 11 calculates a normal vehicle speed Vsou as follows at step 717:

$$Vsou = \sqrt{[(1 + Kh \cdot Vso^2) \cdot N \cdot L \cdot gyc/θf]} \quad (5)$$

It then calculates a deviation ΔV=Vsou–Vso, and also calculates a correction ΔSiu to the slip rate of each wheel at step 718. Specifically, the correction ΔSiu to the slip rate of each wheel is chosen as either a product of the constant Ki allocated to each wheel, ΔV, and the gain K corresponding to μ (obtained at step 706 in FIG. 13), to which a negative sign is applied, or 0, whichever is greater.

(4C) "Oil pressure standby control" subroutine 700C (FIG. 16)

The detail of the "oil pressure standby control" subroutine 700C shown in FIG. 11 is indicated in FIG. 16. Here, it is initially examined if there is the possibility that "B-STR-OS commencement/termination decision" subroutine 300D (FIG. 9) determines the need of commencement (the need for intensification) in near future, at steps 901 and 902. Specifically, a commencement zone 3 shown in a block for the step 901 in FIG. 16 corresponds to the commencement zone 1 shown at the step 304 in FIG. 9, which is shifted to lower values for both the vehicle body speed Vso and the lateral slip angular rate Dβ, and it is examined if the combination of Vso and Dβ lies in the commencement zone 3. If the combination lies in this zone, it is determined at step 901 that there is a high possibility that "intensification" may be required subsequently. If it is found that the combination does not lie in the commencement zone 3, it is then examined if it lies in a commencement zone 4 shown in a block for the step 902 in FIG. 16, which corresponds to the commencement zone 2 shown at step 305 in FIG. 9, shifted to lower values for both the vehicle body speed Vso and the lateral slip angle β. If it lies therein, it is determined at step 902 that there is a high possibility that the "intensification" may be required subsequently. If the combination does not lie in the commencement zone 4, it is further examined whether there is a possibility that the "B-STR-US commencement/termination decision" subroutine 300E (FIG. 10) determines the need of commencement (the need of intensification) in near future, at step 903A.

In the "B-STR-US commencement/termination decision" subroutine 300E, step 317 required that gyc/gyea<k2 and the lateral acceleration gyc>k3 for the commencement. Accordingly, at step 903A in FIG. 16, the examination required is to see if gyc/gyea<Pk2, Pk2>k2 and if the lateral acceleration gyc≥Pk3, Pk3<k3. If the inequalities gyc/gyea≤Pk2 and gyc≥Pk3 apply, it is determined that there is a high possibility that the "intensification" may be required subsequently.

Figure 23:
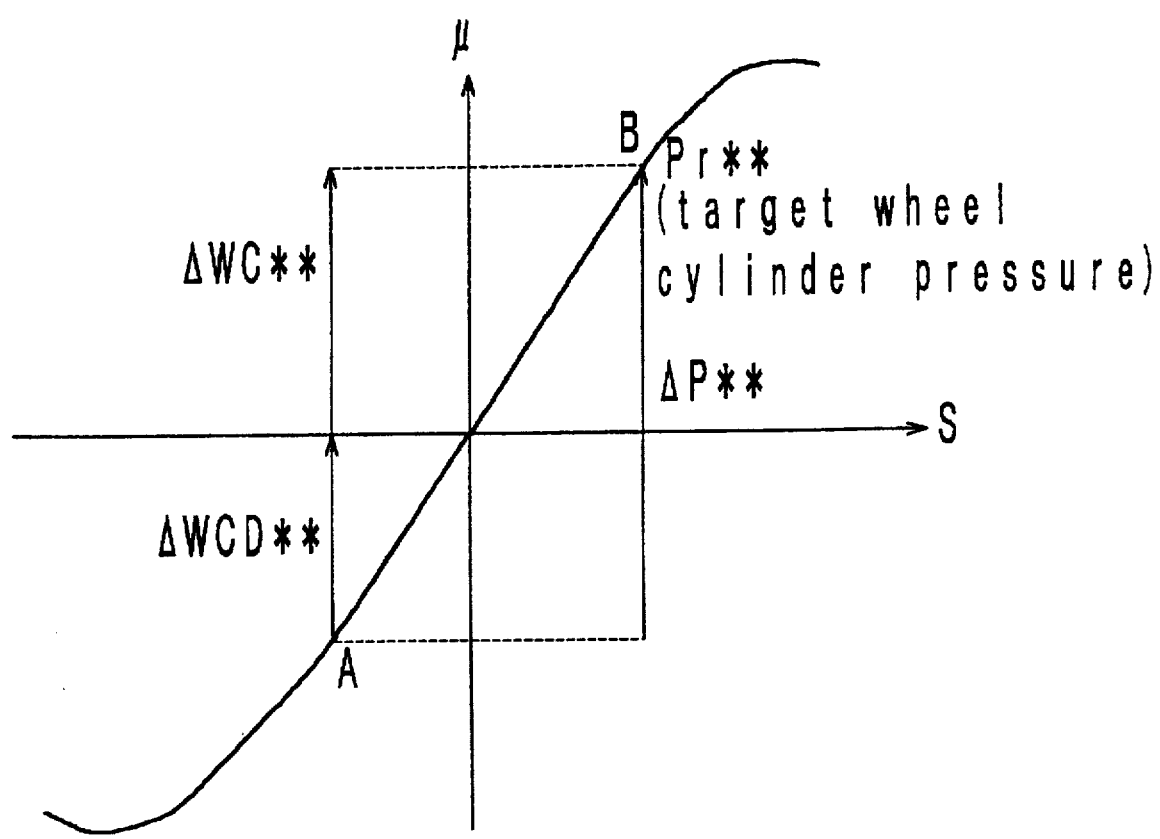
FIG. 23 graphically shows a wheel brake pressure target value which is determined in correspondence to a coefficient of friction of road surface (an estimated value) μ and a wheel slip rate (an estimated value) S.

It is to be noted that there is a relationship as graphically illustrated in FIG. 23 between the slip rate S of a wheel relative to the road surface and the coefficient of friction μ of the road surface with respect to the wheel. A positive region on the abscissa, or the right-hand region as viewed in FIG. 23, represents a decelerating slip region in which the peripheral speed of rotation of the wheel is equal to or less than the travelling speed of the vehicle while a negative region or the left-hand region represents an accelerating slip region in which the peripheral speed of rotation of the wheel exceeds the travelling speed of the vehicle. Assuming that the rotation of the wheel relative to the road surface is located at point A at the commencement of either B-STR-US control or B-STR-OS control, a time interval ΔP**t required to intensify a target pressure of the wheel brake from point A (accelerating slip) to point B (decelerating slip) is expressed by the following equation:

$$ΔPt=ΔWCot+ΔWCDt+ΔWCt \quad (6)$$

where ΔWCot represents a non-linear region intensification interval (initial pressurization interval), ΔWCDt an accelerating slip region intensification interval and ΔWC**t a decelerating slip region intensification interval.

Figure 24:
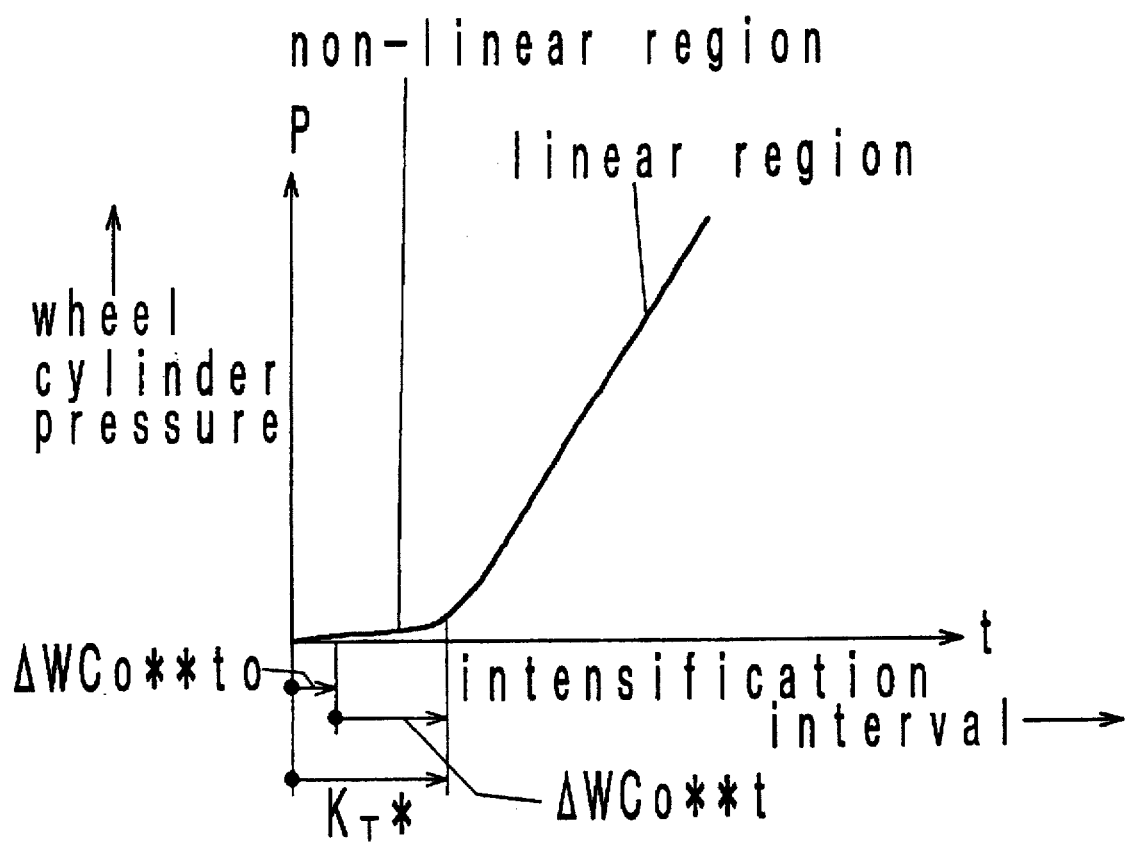
FIG. 24 graphically shows a wheel brake pressure against time after initiating the supply of discharge pressure from a pump 21 to a wheel brake.

Specifically, at point A, a wheel brake is decompressed (and hence no brake pressure is applied), and if a brake pressure is applied to this wheel brake, the wheel brake pressure initially rises non-linearly, as indicated in FIG. 24, and subsequently rises substantially linearly. ΔWCot represents a time interval in which the wheel brake pressure rises until a substantially linear region is reached, $\Delta WCD^{}t$ a time interval in the linear region required for the wheel brake pressure to rise to the lower boundary, or to the abscissa of FIG. 23, in the decelerating slip region, and $\Delta WC^{**}t$ a time interval to rise from the lower boundary to point B.

The non-linear region intensification interval or the initial pressurization interval $\Delta WCo^{**}t$ can be expressed by the following equation:

$$\Delta WCo^{**}t = KT^* - \Delta WCo^{**}t0 \qquad (7)$$

where $\Delta WCo^{**}t0$ represents an intensification interval until the oil pressure standby control is commenced, and $KT^*$ a time interval required for either the front or the rear wheel brake pressure to reache the linear region (see FIG. 24).

$$\Delta WCo^{}t0 = Q0^{}t0/KQt^* \qquad (8)$$

where t0 represents a time after the commencement of the oil pressure standby control, and $KQt^*$ a conversion factor from a hydraulic pressure to time.

The initial hydraulic pressure estimate $Q0^{**}t0$ is estimated in the following manner, so as to distinguish between a normal braking operation and a wheel brake pressure controlling operation.

When wheel brake pressure is being controlled:
It is determined by the following equation:

$$Q0^{}t = Q0^{}(t-1) + K\ UP^* \cdot T\ UP^{**}\Delta t - K\ DOWN^* \cdot T\ DOWN^{**}\Delta t \qquad (9)$$

where $Q0^{}(t-1)$ represents a previously calculated value of $Q0^{}t$, T $UP^{}$ an equivalent intensification interval, T $DOWN^{}$ an equivalent decompression interval, K $UP^*$ a gradient of intensification, K $DOWN^*$ a gradient of decompression and $\Delta t$ a time interval between time t and (t−1).

During normal braking operation
It is determined by the following equation:

$$Q0^{**}t = MCt \qquad (10)$$

where MCt represents a master cylinder pressure.

$Q0^{**}t$ is detected by a master cylinder pressure sensor MC (see FIG. 1), but may be estimated from an estimated vehicle body acceleration.

Returning to the equation (7) and considering the initial pressurization interval required during the oil pressure standby control, the non-linear region intensification interval $KT^*$ assumes a value which is inherently determined by the wheel brake, the capacity of the hydraulic pressure pump 21 (FIG. 1) or the like. Accordingly, it is chosen to be 100 msec for the front wheel brake, and 70 msec for the rear wheel brake.

If a decision is rendered in FIG. 1 that there is a high possibility of "intensification" for the front wheel FR (the wheel thus determined being referred to as an oil pressure standby wheel), the calculation mentioned above calculates an estimated value Q0FR for the initial hydraulic pressure either according to the equation (9) or (10) depending on whether or not the wheel brake pressure control is or is not used. Then, the equations (7) and (8) is used to calculate $WCo^{}t$ (step 208 in FIG. 7). At this time, in FIG. 1, the solenoid operated switching valves 61, 64 and the solenoid operated open/close valve 66 are energized, and simultaneously the motor 24 (pump 21) is driven, establishing a communication between the wheel brake 51 of the front wheel FR which is determined as having a high possibility of "intensification" and a pump pressure (secondary brake pressure), introducing brake operating hydraulic for a time interval of the calculated $\Delta WCo^{}t$.

Returning to FIG. 16, when a high possibility of "intensification" is determined at step 903A, the wheel brake associated with the oil pressure standby wheel is examined if it is subject to the ABS control or traction control at steps 903B and 903C. If either control is applied, there is no need to provide a precedental intensification for the braking effort distribution control, and accordingly, "0" (meaning no need for the precedental intensification) is written into register PBSTRi at step 903D. Otherwise, the microcomputer 11 energizes the motor 24 at step 904. At this time, the regulator REG is given an boosting command signal at step 905. The regulator REG applies a higher voltage 14 V to the motor driver 19a.

It is then examined if the oil pressure standby wheel is a front wheel (either FR or FL) at step 906. If the standby wheel is a front wheel, the solenoid operated switching valve 64 and the solenoid operated open/close valve 66 are energized at step 907, whereby the discharge pressure from the hydraulic pressure pump 21 is applied to the increasing solenoid valves 61 and 62. Because the valve 64 is energized, a flow from the discharge port of the pump 21 passes to the reservoir 70 through a check valve 81 which is throttled to a small flow rate, and is also passed through the orifice of the open/close valve 66 to the reservoir 4, whereby the hydraulic discharged from the pump 21 is partly returned to the reservoir 70. When the quantity of the hydraulic in the reservoir 70 is reduced, and a suction pressure is raised, the hydraulic from the reservoir 4 is passed through the orifice of the valve 66 to the suction port of the pump 21.

Figure 17:
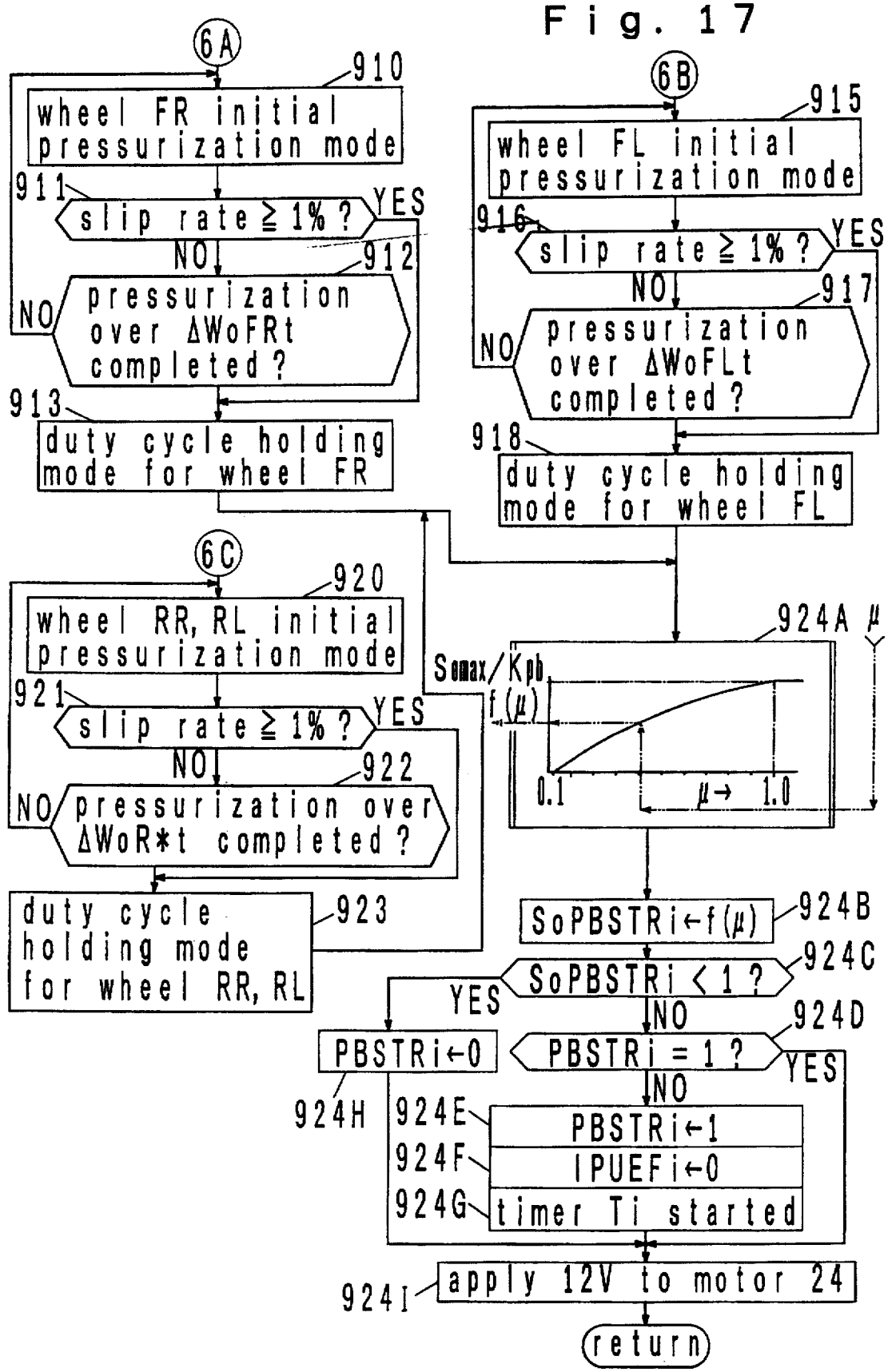
FIG. 17 is a flow chart of the remainder of "oil pressure standby" subroutine 700C shown in FIG. 11 in detail.

The microcomputer 11 then examines if the oil pressure standby wheel is right wheel FR or left wheel FL. If it is right wheel FR, it energizes the valve 61 at step 909. If it is left wheel FL, the valve 62 is energized at step 914. When energized, the valve 61 connects the front-right wheel brake 51 to the increasing solenoid valve 31 to be intensified. When energized, the valve 62 connects the front-left wheel brake 52 to the increasing solenoid valve 33 for intensification. Referring to FIG. 17, the microcomputer 11 maintains such connection (initial pressurization mode) at step 910. For example, for the intensification (initial pressurization) of the front-right wheel brake 51, when the slip rate of this wheel becomes equal to or greater than 1% (in the decelerating slip region), the microcomputer 11 performs a valve operation in the duty cycle holding mode in order to reduce the rate of increasing the front-right wheel brake pressure (steps 910, 911 and 913). The same applies to the intensification (initial pressurization) of the front-left wheel brake 52 (see steps 915 to 918).

When the oil pressure standby wheel is a rear wheel, the microcomputer 11 energizes the solenoid operated switching valve 63 and the solenoid operated open/close valve 65 at step 919. This allows the discharge pressure from the pump 21 to be applied to the rear-right wheel brake 53 and the rear-left wheel brake 54 through the increasing valves 35 and 37, respectively (intensification). When energized, the valve 63 connects the discharge port of the pump 21 to the reservoir 70 through a check valve 80 which is throttled to a small flow rate, and also connects the discharge port to the reservoir 4 through the orifice of the solenoid operated open/close valve 65, whereby the hydraulic discharged from the pump 21 is partly returned to the reservoir 70. When the quantity of hydraulic in the reservoir 70 is reduced and the suction pressure is raised, the hydraulic in the reservoir 4 flows to the suction port of the pump 21 through the orifice of the valve 65. For example, for the intensification (initial pressurization) of the rear-right wheel 53, when the slip rate of the rear-right wheel becomes equal to or greater than 1% (in the decelerating slip region), the microcomputer 11 performs a valve operation for the duty cycle holding mode in order to reduce the rate of increasing the front-right wheel brake pressure (steps 920, 921 and 923). When the oil pressure standby wheel is the rear wheel, the rear-left wheel brake 54, which is not the oil pressure standby wheel, is similarly controlled. In this instance, the intensification of the wheel brake 54, which is not specified as the oil pressure standby wheel, has a significance of a precedental intensification for the subsequent depression of the brake pedal 3.

Returning to the initial pressurization for the front-right wheel when it is the oil pressure standby wheel (steps 910 to 913), it is to be noted that if the slip rate of the front-right wheel FR is less than 1% at step 911, the microcomputer 11 examines if a time corresponding to ΔWCoFR (meaning that  equals to FR) has passed (at step 912), and if the time has passed, performs a valve operation for the duty cycle holding mode at step 913. Thus, if the wheel slip rate becomes equal to or greater than 1% by the time ΔWCot passes, the valve operation for the duty cycle holding mode is initiated at that point in time. However, if ΔWCo**t passes without the wheel slip rate reaching 1%, the valve operation for the duty cycle holding mode is initiated at that point in time. The same applies when the oil pressure standby wheel is either front-left wheel or any one of rear wheels.

A valve operation for the duty cycle holding mode comprises a repetition of an off mode and an on mode. For example, when the oil pressure standby wheel is a front-right wheel, the increasing open/close valves 31 and 66 are both turned off in the off mode (in which the wheel brake pressure is maintained since the reducing (or decreasing) open/close valve 32 is kept off), and the both open/close valves 31 and 66 are energized in the on mode (during which an intensification takes place by applying a pump pressure to the wheel brake).

The described initial pressurization allows the wheel brake pressure of the oil pressure standby wheel to rise substantially at the beginning end of the linear region (FIG. 24) when either B-STR-US control or B-STR-OS control is commenced, thus allowing such control to be effective quickly and enhancing the stability and the reliability of the control. Any cavitation and resulting underpressure of the braking hydraulic circuit upon commencement of driving the hydraulic pressure pump 21 will be eliminated by the time B-STR-US control or the like is commenced. Since no excessive load is demanded upon the hydraulic pressure pump 21 at the commencement of B-STR-US control or the like, there can be no overload upon the hydraulic pressure pump 21. In addition, when the brake pedal 3 is depressed, the wheel brake is previously pressurized, thus allowing a braking effect to manifest itself early in response to the depression of the brake pedal.

Check valves 88 and 89 shown in FIG. 1 are used as bypasses when the switching valves 63, 64 and/or open/close valves 65, 66 fail.

Referring to FIG. 17, upon completion of the initial pressurization, the microcomputer 11 calculates a standby slip target rate f(μ) corresponding to an estimated value μ of the coefficient of friction of the road surface, and writes it into a register SoPBSTRi which is allocated to a wheel brake for which a high possibility of intensification has been determined (steps 924A and 924B in FIG. 17). The standby slip target rate f(μ) has an upper limit of Somax/Kpb, which is the wheel slip rate Somax corresponding to a maximum value (which is denoted in block 924A in FIG. 17 as being 1.0) of the coefficient of friction μ of the road surface, divided by Kpb. When the estimated value μ is equal to or greater than 1.0, the target rate has an upper limit of Somax/Kpb and when the estimated value μ is less than 0.01, the target rate is equal to 0. When the estimated value μ is from 0.01 to 1.0, the target rate has a value proportional to the estimated value μ. Kpb has a value in a range from 5 to 20, and in the embodiment, Kpb is chosen to be equal to 6. The lateral slip angle β or the like may be considered in the calculation of standby slip target value f(μ), in addition to the coefficient of friction μ of the road surface. When the target rate f(μ) is less than 1%, register PBSTRi is cleared at step 924H, indicating that there is no need of precedental intensification. When the target rate is equal to or greater than 1%, it is examined at step 924D whether data contained in register PBSTRi is "1" representing the need for the standby slip rate servo control. Otherwise, since this is the first time that the need for the standby slip rate servo control has been determined, "1" is written into register PBSTRi at step 924, and "0", indicating that the standby slip rate servo control has not yet been completed, is written into register IPUEFi at step 924F. A timing operation is initiated at step 924G in order to determine the time duration of the servo control. The voltage which is applied to the motor 24 through the regulator REG is switched from 14 V to 12 V at step 9241.

A pressure regulation of a wheel brake associated with the oil pressure standby wheel is executed in the "slip rate servo control" subroutine 700D (FIGS. 18 to 20) in order to bring the slip rate of such wheel brake to the standby slip target value (corresponding to data contained in register SoPBSTRi), as will be further described later.

Figure 18:
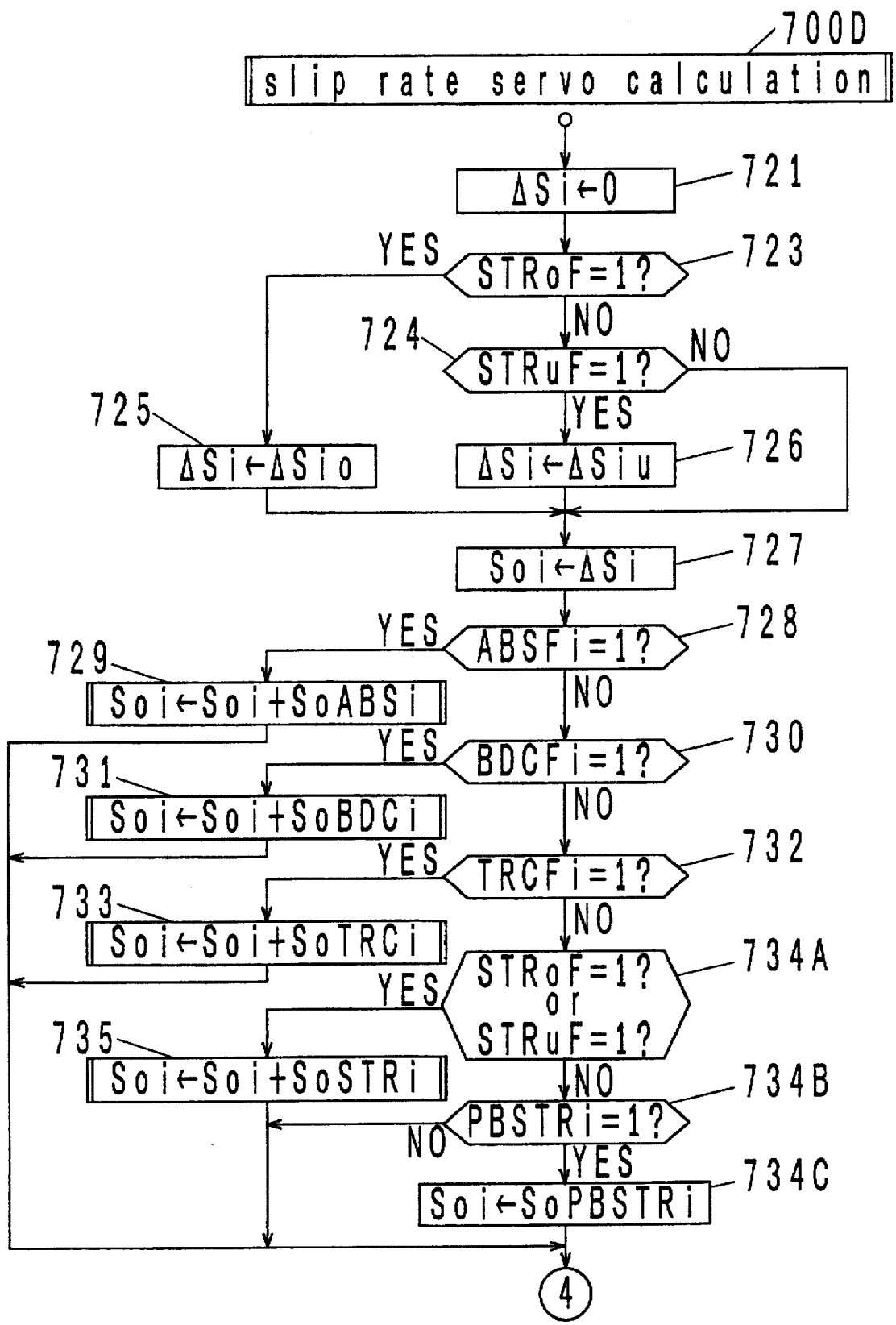
FIG. 18 is a flow chart of part of "slip rate servo calculation" subroutine 700D shown in FIG. 11 in detail.
Figure 19:
FIG. 19 is a flow chart of another part of "slip rate servo calculation" subroutine 700D shown in FIG. 11 in detail.
Figure 19:
Figure 20:
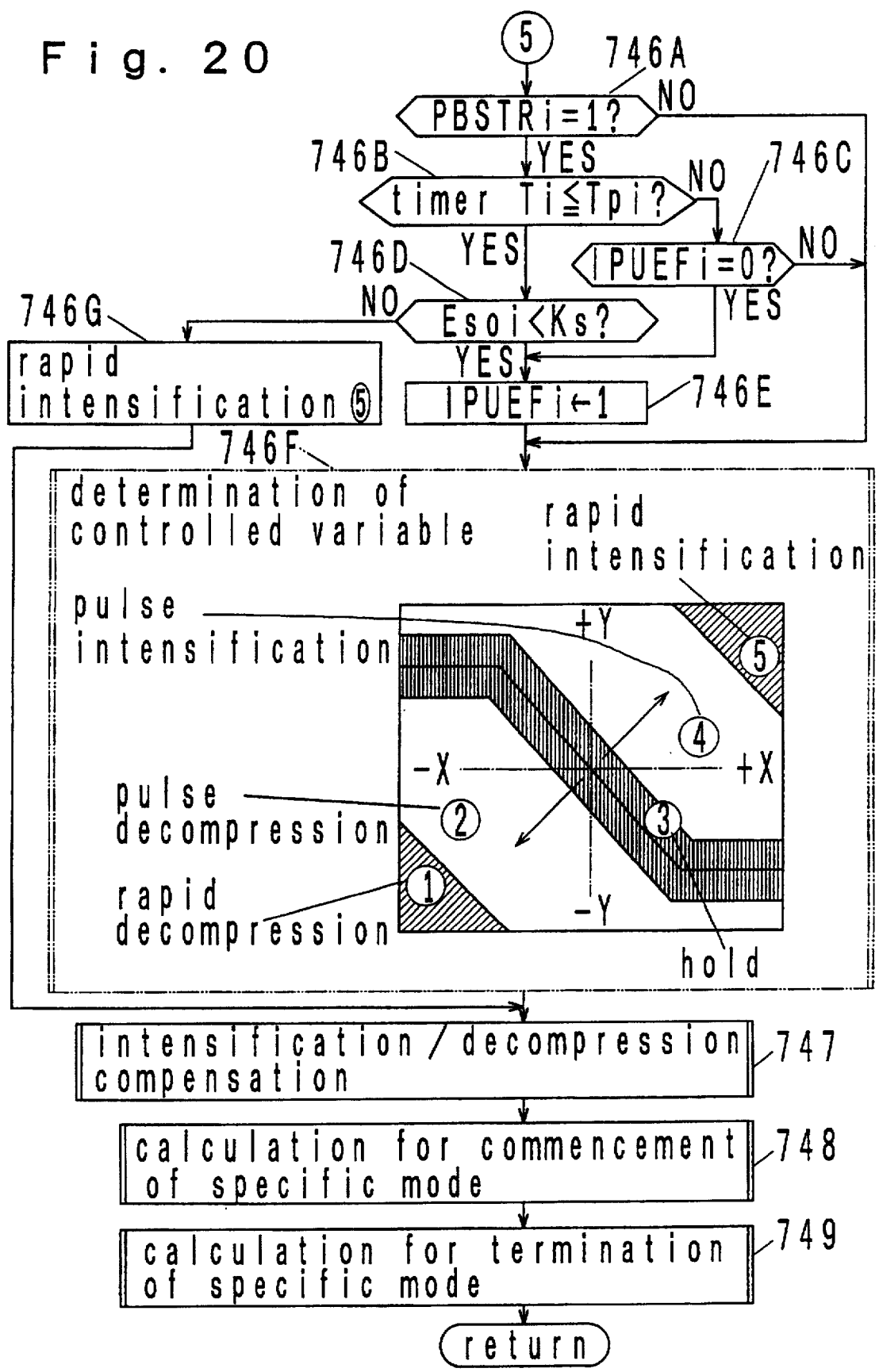
FIG. 20 is a flow chart of a further part of "slip rate servo calculation" subroutine 700D shown in FIG. 11 in detail.

(4D) "Slip rate servo calculation" subroutine 700D (FIGS. 18 to 20)

Initially, an examination is made to see if "B-STR-OS control" or "B-STR-US control" is needed. If "B-STR-OS control" is needed (STRoF=1), data in register ΔSio which is calculated at step 709 is selected as slip rate deviation ΔSi. If "B-STR-US control" is needed (STRuF=1), data contained in register ΔSiu which is calculated at step 718 is selected as slip rate deviation ΔSi (steps 721 to 726). If neither "B-STR-OS control" nor "B-STR-US control" is needed (both STRoF and STRuF are equal to 0), a slip rate correction ΔSi is chosen to be equal to 0 (steps 721 to 726).

At step 727, the slip rate target value Soi is chosen as slip rate correction ΔSi, and if "ABS control" is needed (ABSFi=1), a slip rate target value SoABSi which is predetermined in the "ABS control" is added to the slip rate target value Soi and the sum is updated as slip rate target value Soi (steps 728 to 729). If "2-BDC control" is needed (BDCFi=1), a slip rate target value SoBDCi which is determined in the "2-BDC control" is added to the slip rate target value Soi, and the sum is used to update the slip rate target value Soi (steps 730 and 731). If "TRC control" is needed (TRCFi=1), a slip rate target value SoTRCi which is determined in the "TRC control" is added to the slip rate target value Soi, and the sum updates the slip rate target value Soi (step 732). If "B-STR control" is needed (STRoF=1 or STRuF=1), a slip rate target value SoSTRi which is determined in the "B-STR control" is added to the slip rate target value Soi, and the sum is used to update the slip rate target value Soi (steps 734A and 735). If none of the above wheel brake pressure controls is needed, it is examined if data contained in register PBSTRi is "1", indicating the need for a precedental intensification, and if so, the standby slip rate target value (represented by data contained in register SoPBSTRi) is chosen as a slip rate target value Soi (steps 734B and 734C).

In the present embodiment, slip rate target values SoABSi, SoBDCi, SoTRCi and SoSTRi are fixed values.

Specifically, SoABSi=0.15, SoBDCi=0.01, SoTRCi=−0.07 and SoSTRi=0.

In the "control priority handling" subroutine 300F, during the execution of the "ABS control" routine 400 (as indicated by ABSFi=1), the "B-STR control" routine 700 is executed. (It is to be noted that data in registers STRoF and STRuF are not modified). However, the "2-BDC control" routine 500 and the "TRC control" routine 600 are inhibited. Specifically, registers BDCF and TRCF are cleared. During the execution of the "B-STR control" routine 700 (as indicated by STRoF=1 or STRuF=1), the "ABS control" routine 400 is executed. Thus, register ABSF is not cleared. During the execution of the "2-BDC control" routine 500 (as indicated by BDCF=1), the "TRC control" routine 600 is inhibited, by clearing register TRCF. Thus, when ABSF=1, STRoF=1 or STRuF=1, it follows that BDCF=0 and TRCF=0, and the slip rate target value Soi which is calculated at steps 728 to 734A and 735 does not contain SoBDCi and SoTRCi. When ABSF=0, STRoF=0 and when STRuF=0 and BDCF=1, it follows that BTRC=0, and accordingly, the slip rate target value Soi will be the slip rate correction (corresponding to ΔSi mentioned above) calculated at steps 721 to 727 for the "2-BDC control" plus SoBDCi. When ABSF=0, STRoF=0, STRuF=0, BDCF=0 and TRCF=1, the slip rate target value Soi will be the slip rate correction (corresponding to ΔSi) calculated in a manner similar to steps 721 to 727 for the "TRC control" plus SoTRCi.

When ABSF=1, STRoF=0 and STRuF=0, it follows that BDCF=0 and TRCF=0, and the slip rate target value Soi will be equal to the slip rate correction (corresponding to ΔSi) calculated in a manner similar to steps the 721 to 727 for the "ABS control" plus SoABSi. When ABSF=0, STRoF=1 or STRuF=1, it follows that BDCF=0 and TRCF=0, and the slip rate target value Soi will be the slip rate correction ΔSi calculated at steps 721 to 727 for the "B-STR control" plus SoSTRi.

Continuing the description with reference to FIG. 19, when the slip rate target value Soi has been calculated in the manner mentioned above, the microcomputer 11 calculates a slip rate deviation Esoi and wheel acceleration deviation EDi for each wheel at step 736 in the following manner:

Esoi=Soi−(reference speed−speed of wheel being controlled−BVWi)/reference speed     (11)

EDi=reference acceleration−acceleration of wheel being controlled     (12)

Since the processing here involved is for the purpose of B-STR control, reference speed, speed of wheel being controlled, reference acceleration and acceleration of wheel being controlled are those indicated under the column of "B-STR control" in the Table shown in a block for the step 736.

At step 737A, it is examined if the absolute magnitude of the slip rate deviation Esoi is less than a given value ε. If the deviation is equal to or greater than the given value ε, an integrated value I Esoi of the slip rate deviation Esoi is calculated at step 737B. Specifically, an integrated value of slip rate deviation I Esoi which was calculated previously added with the slip rate deviation Esoi which is currently calculated, multiplied by a gain GIi represents the integrated value of the slip rate deviation I Esoi of the current calculation. In the present embodiment, the gain GIi is equal to 1. In order to limit the integrated value of the slip rate deviation I Esoi between an upper limit of I EsoiU and a lower limit of I EsoiL, whenever I Esoi exceeds I EsoiU, the integrated value of the slip rate deviation I Esoi is updated to the upper limit I EsoiU. Conversely, if it is less than I EsoiL, the integrated value of the slip rate deviation I Esoi is updated to the lower limit value I EsoiL (steps 738 to 741). At step 737C, I Esoi is cleared to 0 whenever |Esoi|<given value ε.

Figure 21:
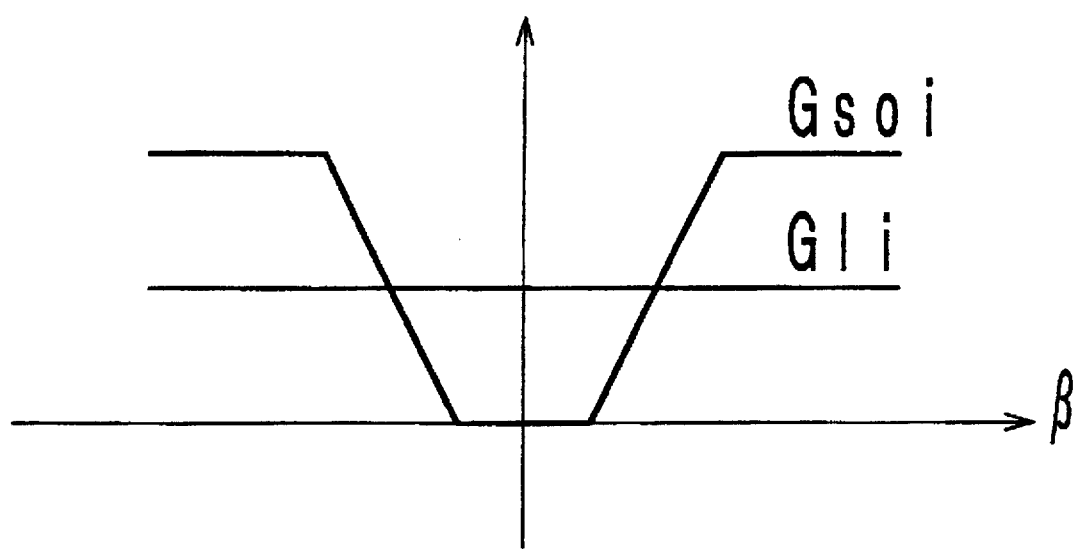
FIG. 21 graphically shows a change in the gain Gsoi, indicated at step 743 in FIG. 19, against a change in the lateral slip angle β.

At step 743, the parameter Y which is used in determining the brake pressure controlling mode is calculated as follows:

$$Y = Gsoi \cdot (Esoi + I\ Esoi) \quad (13)$$

where Gsoi represents a gain, and assumes a small value when the absolute value of the lateral slip angle β is small, and assumes a high value when the absolute value is high, as shown in FIG. 21.

At step 745, another parameter X used in determining the brake pressure controlling mode is calculated as follows:

$$X = GEDi \cdot EDi \quad (14)$$

where GEDi is a constant.

Referring to FIG. 20, the microcomputer 11 then examines data contained in register PBSTRi at step 746A. If the data is equal to "1", indicating that there is a need for a precedental intensification, the microcomputer then examines a time count Ti (which started at step 924G in FIG. 17) has exceeded a preset value Tpi at step 746B, thus, seeing if the precedental intensification for the preset interval has been made. If the time count is less than the preset value Tpi and if the precedental intensification has not yet been completed (as indicated by "1" data in register IPUEFi), the microcomputer establishes a rapid intensification ⑤ when the slip rate deviation Esoi is equal to or greater than Ks % (steps 746C, 746D and 746G). This causes the wheel brake pressure to be intensified. In the present embodiment, Ks is chosen to be equal to −1. If the time count Ti is equal to or greater than the preset value Tpi and if the slip rate deviation is less than Ks (−1%), "1", indicating the completion of the precedental intensification, is written into register IPUEFi at step 746E.

When the precedental intensification is unnecessary (PBSTRi=0) and upon completion of the precedental intensification (IPUEFi=1), a memory access is used to determine where a combination of parameters X and Y is located for the purpose of executing the intended wheel brake pressure control at step 746F. Referring to a block which represents the step 746F, it will be seen that a particular combination (X, Y) can be located in any one of a plurality of predetermined regions including ① rapid decompression region, ② pulse decompression region, ③ holding region, ④ pulse intensification region and ⑤ rapid intensification region. For purpose of illustration, assuming that a wheel being controlled is FR (wheel brake 51), when a subsequent control, specifically, "output control" routine 800, determines that the combination is located in the rapid decompression region ①, a continuous decompression is established. Specifically, the solenoid operated switching valve 61 is energized, the solenoid valve 31 is energized (valve closed) and the solenoid valve 32 energized (valve open). When the combination (X, Y) is determined to be in the pulse decompression region ②, a decompression (as mentioned above) for a given interval and a holding set-up for a given interval are alternately repeated. Specifically, during the holding set-up, the solenoid operated switching valve 61 is energized, the solenoid valve 31 is energized (valve closed) and the solenoid valve 32 is deenergized (valve closed). When the combination is determined to be in the holding region ③, the holding set-up is continuously established. When the combination is determined to be in the pulse intensification region ④, an intensification for a given time interval and a holding set-up for a given interval are alternately repeated. In this instance, the intensification takes place by energizing the solenoid operated switching valve 61, deenergizing the solenoid valve 31 (valve open) and deenergizing the solenoid valve 32 (valve closed). When the combination is determined to be in the rapid intensification region ⑤, the continuous intensification is established. "Rapid intensification ⑤" established at step 746G corresponds to such continuous intensification.

As a result of described operations, a wheel brake which is to be pressurized is determined before the braking effort distribution control (B-STR, 2-BDC) is required (FIG. 16), a wheel slip rate target value corresponding to a calculated value μ of the coefficient of friction is set up (FIG. 17), a wheel slip rate deviation Esoi is calculated (FIG. 19), and the wheel brake which is to be pressurized is intensified (by precedental intensification) to a limit of the preset interval Tpi until the wheel slip rate deviation Esoi becomes less than Ks, which is −1% in the present embodiment (steps 746A to 746D and 746G in FIG. 20). When the wheel slip rate deviation Esoi is reduced below Ks or when the intensification interval exceeds the preset interval Tpi, the slip rate servo control (step 746F in FIGS. 19 and 20) which brings the wheel slip rate deviation Esoi to 0 takes place. The slip rate servo control executes not only the intensification, but may similarly execute a brake pressure modifying mode during an actual braking effort distribution control such as a pulse intensification, holding, pulse decompression and a rapid decompression as well depending on the condition of the vehicle. When the need for the braking effort distribution control is not determined, but the need for a precedental intensification is determined and such determination lasts for a long time, the operation is switched to the slip rate servo control after the intensification (steps 746A to 746D and 746G in FIG. 20, involving only the intensification) has continued for the preset time interval Tpi or when the slip rate deviation Esoi is reduced below Ks. Such slip rate servo control suppresses an excessive intensification which may result from the precedental intensification.

To give an example, the process of setting up the intensification, the decompression or the like will be summarized with respect to an over-steer compensation control (B-STR-OS control), which is one of items of the braking effort distribution control.

At step 202 (FIG. 7) of the "vehicle status estimation" routine 200, the coefficient of friction μ is calculated. A factor K corresponding to this coefficient of friction, which increases with the magnitude of μ, is calculated at step 706 (FIG. 13) in the "B-STR-OS control" subroutine 700A. At next step 707 (FIG. 13), it is determined in which one of zones A0 to A7, a combination of the lateral slip angle β and the lateral slip angular rate Dβ lies. At following step 708 (FIG. 14), a slip rate correction ΔS is determined in accordance with such decision of zone. Specifically, the slip rate correction ΔS has a greater value for a greater value of the lateral slip angle β and a greater value of the lateral slip angular rate Dβ. The product of the factor K and the slip rate correction ΔS is chosen as a correction ΔSio for each wheel (step 709 in FIG. 14), and the sum of the wheel correction ΔSio and a target value SoSTRi which is used in the B-STR control is chosen as a target slip rate Soi (steps 723, 725, 727, 734 and 735 in FIG. 18). A slip rate deviation Esoi and an acceleration deviation EDi are then calculated (at step 736 in FIG. 19). An integrated value I Esoi of the slip rate deviation Esoi is derived to provide Y, and the acceleration deviation EDi is provided as X (steps 737 to 745 in FIG. 19). The control takes place in accordance with the combination of X and Y. If both X and Y are positive and the both have large values, either a pulse intensification or a rapid intensification is established. If both X and Y are negative and the both have large absolute magnitudes, a pulse decompression or a rapid decompression is established (step 746F in FIG. 20).

When the wheel brake pressure is set up in this manner, as the lateral slip angle β increases, for example, the target slip rate Soi is chosen to be large, whereby the wheel brake pressure is regulated so that an increased actual slip rate is produced. (The actual output which effects such pressure regulation takes place in the "output control" routine 800 shown in FIG. 5.) Consequently, the wheel brake pressure rises, and the lateral slip angle increases to produce a moment which opposes the spin moment, thus suppressing the lateral slip angle from increasing.

When the coefficient of friction μ is high, it is expected that the intensification of the wheel brake pressure effectively suppresses an increase in the lateral slip angle or suppresses a spinning behavior. In this instance, step 706 (FIG. 13) determines a high value for the target slip rate Soi, thus producing a remarkable wheel spin suppressing effect. Conversely, if the coefficient of friction μ is low, this not only results in a reduced vehicle spin suppressing effect which results from the intensification of the wheel brake pressure, but may also cause a disturbance to the yaw motion of the vehicle body. In this instance, since step 706 (FIG. 13) determines a small value for the target slip rate Soi, an excessive intensification of the wheel brake pressure is suppressed. In this manner, the coefficient of friction μ is utilized as a parameter in controlling the wheel brake pressure so as to compensate for an over-steer, thus improving the stability of the over-steer compensation.

A target slip rate Soi is determined on the basis of the wheel body lateral slip angle β, the coefficient of friction μ and the lateral slip angular rate Dβ such that a greater lateral slip angular rate Dβ results in a greater target slip rate Soi. In addition, a slip rate deviation ESoi and an acceleration deviation EDi are determined as follows:

| | |
|---|---|
| slip rate deviation ESoi = | target slip rate Soi − actual slip rate |
| acceleration deviation EDi = | acceleration DNVso of a wheel for which no intensification or decompression has been determined − acceleration DNVsoi of a wheel for which an intensification or decompression has been determined. |

When both deviations ESoi and EDi are positive, and have an increased absolute magnitude, a decision for intensification is rendered. If they are both negative and have an increased absolute magnitude, a decision for decompression is rendered. A slip rate close to the target slip rate Soi is established for the wheel which has been determined as the wheel being controlled. In this manner, this wheel obtains an increased slip rate as compared with the remaining wheels which are not being controlled, thus producing an anti-spin moment.

When there is a need for precedental intensification, the target slip rate Soi is determined in a manner corresponding to the coefficient of friction μ (steps 909A and 909B in FIG. 17), the slip rate deviation Esoi is calculated (step 736 in FIG. 19), and a rapid intensification is set up if the slip rate deviation Esoi is above −1 (step 746G in FIG. 20). If the deviation Esoi reduces below −1 or if the rapid intensification continues over the preset interval Tpi, the slip rate servo control is entered. During the precedental intensification, if the coefficient of friction μ is high, an increased target value is established for the standby slip rate (steps 909A and 909B in FIG. 17), producing a relatively sharp pressure rise by the precedental intensification to achieve an early pressure rise for the wheel brake pressure control in order to compensate for an over-steer, thus achieving an enhanced response to the control. If the coefficient of friction μ is low, a pressure rise which is required for the wheel brake in order to compensate for the over-steer is reduced, but a pressure rise due to the precedental intensification is also reduced in this instance, thus avoiding any excessive pressure rise as a result of the wheel brake pressure control occurring for the purpose of an over-steer compensation.

To give another example, the process of establishing an intensification, decompression or the like (step 746F in FIG. 20) during the under-steer compensation control (B-STR-US control) will be briefly summarized. A lateral acceleration gyc detected by the lateral acceleration sensor GY (or more exactly, a value corrected at step 201 in FIG. 7) will be a value which corresponds to the actual turning of the vehicle body. Thus, the lateral acceleration will be increased for an increased turning rate and will be reduced for a low turning rate. At step 311 in FIG. 10, a reference lateral acceleration gye is calculated in accordance with the steer angle θf and the vehicle speed Vso, and at steps 312 to 316, the reference lateral acceleration gye is corrected by an amount corresponding to a lag in the turning with respect to the steering operation, and at steps 312 to 318 in FIG. 10, "1" is written into register STRuF for gyc<k2·gyea, provided gyc>k3.

At step 717 in FIG. 15, a model vehicle body speed Vsou which produces a lateral acceleration gyc upon the vehicle body at the steer angle θf is estimated or calculated, and a target slip rate deviation ΔSiu corresponding to a deviation ΔV of the vehicle body speed Vso relative to the model vehicle body speed Vsou is determined, and is added to the reference slip rate SoSTRi which is defined in the B-STR-US control to provide a sum which is then used as the target slip rate Soi (steps 724, 726, 727, 734A and 735 in FIG. 18). An actual slip rate of the wheel is estimated on the basis of the wheel rotational speed Vwi and the vehicle body speed Vso, and a slip rate deviation Esoi and an acceleration deviation EDi are calculated (step 736 in FIG. 19). An integrated value I Esoi of the slip rate deviation Esoi is calculated, and a value which is proportional to (slip rate deviation Esoi+integrated value I Esoi) is used as one of parameters, Y, while a value proportional to the acceleration deviation EDi is chosen to be another parameter X, the both parameters being used in determining the need for intensification or decompression (steps 737A to 745 in FIG. 19). A particular increasing or reducing (or decreasing) mode is determined at step 746F in FIG. 20).

As a result of establishing the wheel brake pressure in the manner mentioned above, if the detected lateral acceleration gyc is found to be low relative to the reference lateral acceleration gye, for example, the wheel which is being controlled is intensified. (An actual output which effects such intensification is produced in the "output control" routine 800 of FIG. 5, to be described later.) Consequently, when the detected lateral acceleration gyc is below the reference lateral acceleration gye, a braking action is applied to the vehicle body to reduce the vehicle body speed Vso, implementing a turning at the reference lateral acceleration gye. When the vehicle body speed is high, when the coefficient of friction μ is low or when the tire abrasion is severe, it is likely that the turning may be insufficient for the given steer angle θf. Such insufficient turning is reflected in the lateral acceleration gyc detected by means GY which detects the lateral acceleration of the vehicle body and hence is introduced into consideration in determining the need for the intensification of the wheel brake pressure, resulting in an intensification of the wheel brake pressure. Accordingly, the stability and the reliability of the under-steer compensation control are improved. Specifically, the reference lateral acceleration gye is corrected by an amount corresponding to a lag in the turning relative to the steering operation, and the detected lateral acceleration gyc is compared against the reference lateral acceleration gyea so that an under-steer compensation control takes place so as to provide an optimum lag with respect to the steering rate, further contributing to an enhancement of the stability and the reliability of such control.

Here again, the precedental intensification establishes an increased standby slip rate target value for an increased value of the coefficient of friction μ (steps 909A and 909B in FIG. 17) to result in an early pressure rise as a result of the precedental intensification. In this manner, a pressure rise for the wheel brake pressure control which takes place to compensate for the under-steer occurs early, thus enhancing the response of such control. If the coefficient of friction μ is low, a pressure rise required for the wheel brake pressure in order to compensate for the under-steer will be reduced, but at this time, a pressure rise which is achieved by the precedental intensification is also reduced, thus preventing an excessive pressure rise from occurring as a result of the wheel brake pressure control intended to compensate for the over-steer.

As indicated at steps 728 to 735 in FIG. 18, a target slip rate for the purpose of the under-steer compensation control (B-STR-US control) is calculated in the similar manner as in the ABS control, and is added to a target slip rate which is intended for the ABS control to provide a sum, and the intensification or decompression of wheel brakes are determined in a manner corresponding to this sum, as indicated from step 736 in FIG. 19 to step 746F in FIG. 20. Accordingly there is no conflicting outputs when controlling the brake pressures and a matching between the ABS control and the under-steer compensation control is achieved.

After the intensification or decompression is set up in the manner mentioned above, the microcomputer 11 then watches the current region and the previous region, and if the current region has changed from the previous decompression to intensification (either pulse or rapid intensification) or from the intensification to decompression (either pulse or rapid decompression), it adjusts the braking pressure control mode in order to smooth the rising/falling of the wheel brake pressure (step 747). For example, for a change from the rapid decompression to the pulse intensification during the ABS control, the microcomputer gradually increases the intensification duty cycle (the increasing interval/holding interval) for the pulse intensification from 0 to a given value which is predetermined in the pulse intensification region ④ for a given time interval. Specifically, it sets up the duty cycle for the intensification.

Subsequently, if the B-STR control is commenced, (STRoF=0→STRoF=1 or STRuF=0→STRuF=1), the microcomputer 11 implements an initial pressurization in order to enhance the braking effort response (step 748). In addition, upon termination of the B-STR control (STRoF=1→STRoF=0 or STRuF=1→STRuF=0), the microcomputer controls the brake pressures in order to match the controlling oil pressure applied to the wheel being controlled immediately before such change with the oil pressure in the master cylinder, and terminating the control after such pressure regulation.

Figure 22:
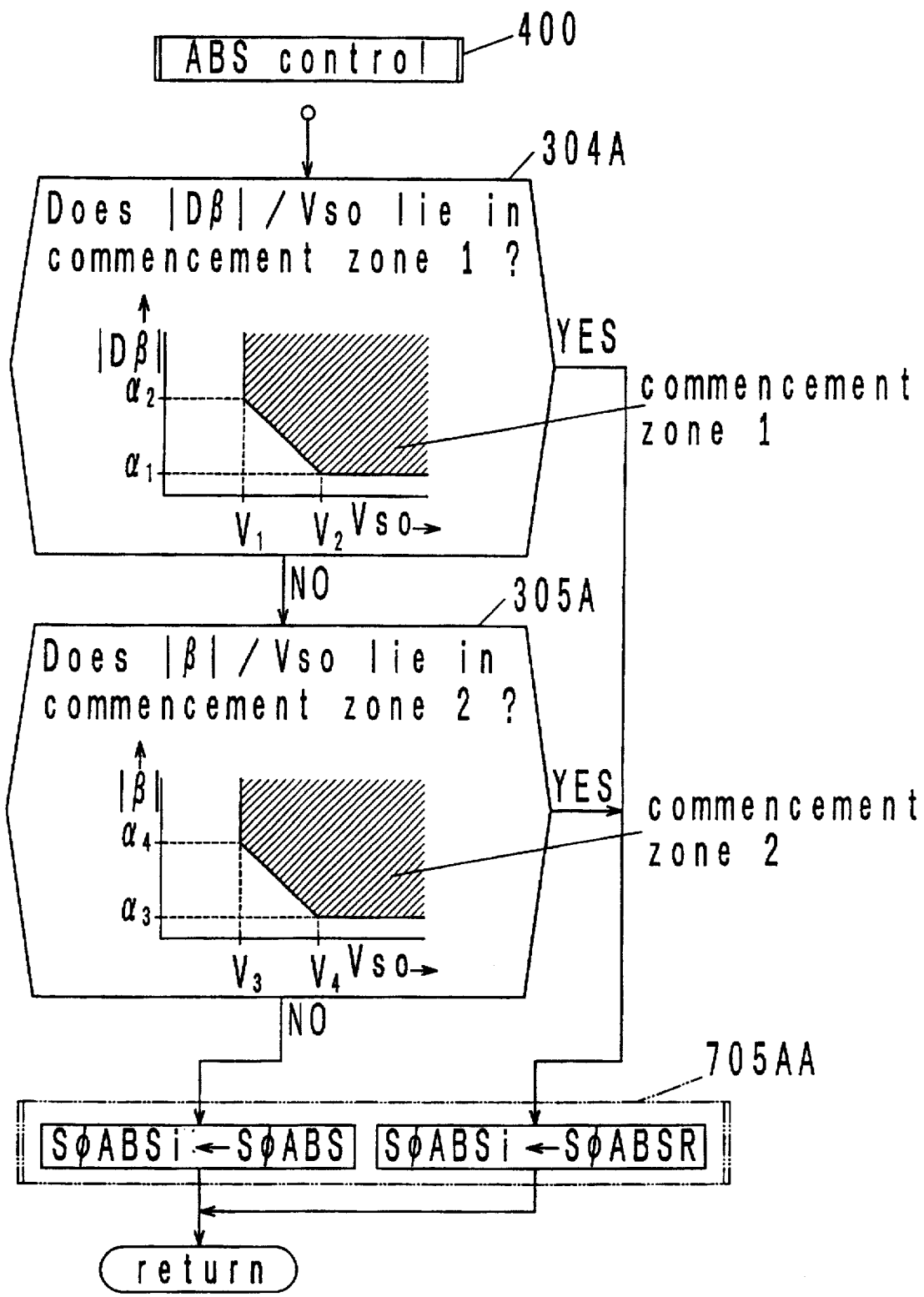
FIG. 22 is a flow chart of part of step or routine 400 shown in FIG. 5.

(5) "ABS control" routine 400 (FIG. 22)

In this routine, it is examined if a combination of the lateral slip angular rate DE and the vehicle body speed Vso lies in a commencement zone 1 or if a combination of the lateral slip angle β and the wheel vehicle speed Vso lies in a commencement zone 2 (steps 304A and 304B). It will be noted that the commencement zones 1 and 2 are the same as those referred to during the "B-STR-OS control" subroutine 700A (steps 304 and 305 in FIG. 9). If such combination lies in either the commencement zone 1 or 2, a decision is rendered that there is a likelihood of a spinning occurring. A target slip rate SφABSi (i=RL, RR) of the rear wheels during the ABS control is set up at SφABSR. If such combination lies in neither of the commencement zones 1 and 2, the target slip rate SφABSi is chosen as SφABS (step 705AA). It is to be noted that SφABSR and SφABS are both constants. SφABS is a normal value while SφABSR is a value less than SφABS and which is used when there is the likelihood of spinning. As for the front wheels, the target slip rate SφABSi (i=FR, FL) are fixed values.

As a result of above arrangement, whenever a likelihood that the vehicle body may spin is detected during a steering operation, a target slip rate (Sy) for the rear-left and rear-right wheels (RR, RL) are reduced to a lower value than that used when there is no such likelihood (step 705AA), thus securing a lateral resistance of the rear wheels and improving the stability of the vehicle while suppressing the likelihood of spinning of the vehicle body during a braked turning operation.

B-STR control, which is a vehicle stability control which suppresses the over-steer or under-steer, takes place concurrently with the ABS control (when it is found necessary). If an ABS control status is entered as a result of a braking operation during the B-STR control, the controlling action which becomes effective during the ABS control to suppress the likelihood of spinning during a steering operation acts in a complementary manner, producing an enhanced vehicle stability.

(6) "Output control" routine 800

In this routine, outputs (for energizing or deenergizing solenoid valves) which realize a braking pressure controlling mode determined in the "ABS control" routine 400, "2-BDC control" routine 500, "TRC control" routine 600 and "B-STR control" routine 700 are produced and delivered to solenoid valve drivers 19b to 19o.

While a preferred embodiment of the invention has been shown and described above, it should be understood that a number of changes and modifications therein are possible such as employing a construction to withdraw a braking hydraulic from the brake master cylinder 2 instead of from the reservoir 4 for use in the initial pressurization. Accordingly, it is not intended that the invention be limited to the specific construction disclosed herein, and all rights are reserved for any changes and modifications coming within the scope of the invention defined by the appended claims.

What is claimed is:

1. A wheel brake pressure controlling system for a vehicle including a first source of pressure for generating a primary pressure corresponding to an operating force resulting from a driver's operation, a second source of pressure for generating a secondary pressure independently from a driver's operation, a brake pressure operating means for selectively supplying one of the primary and the secondary pressure to a plurality of wheel brakes of the vehicle, information processing means for estimating a turning of a vehicle and for judging whether or not the estimated turning of the vehicle lies in an over-steer or an under-steer region and whenever the turning of the vehicle is in an over-steer or under-steer region, for determining at least one wheel brake of the plurality of wheel brakes whose pressure is to be intensified, and output means for supplying the secondary pressure through the brake pressure operating means to the wheel brake which has been determined to have its pressure intensified;

wherein the information processing means judges whether or not a turning of the vehicle lies in a reference region which is located outside the over- or under-steer region, drives the second source of pressure in order to generate the secondary pressure whenever the turning of the vehicle lies in the reference region, determines at least one wheel brake of the plurality of wheel brakes whose pressure is to be intensified, and automatically intensifies the pressure of the wheel brake.

2. A wheel brake pressure controlling system according to claim 1 in which the information processing means performs a slip rate servo control of the wheel brake which is to be automatically intensified.

3. A wheel brake pressure controlling system according to claim 1 in which the information processing means estimates a coefficient of friction of a road surface on which the vehicle runs, chooses a slip rate which is predetermined in relation to the coefficient of friction as a standby target slip rate, determines at least one wheel brake of the plurality of wheel brakes whose pressure is to be intensified whenever the turning of the vehicle lies in the reference region, and automatically intensifies the pressure of the wheel brake in order to bring a wheel slip rate of the wheel brake to the standby target slip rate.

4. A wheel brake pressure controlling system according to claim 1 in which the information processing means estimates a hydraulic pressure applied to a wheel brake, determines an initial pressurization interval which is chosen to be long for a low value of the hydraulic pressure and to be short for a high value of the hydraulic pressure, determines at least one wheel brake of the plurality of wheel brakes whose pressure is to be intensified whenever the turning of the vehicle lies in the reference region, and automatically intensifies the pressure of the wheel brake for the initial pressurization interval.

5. A wheel brake pressure controlling system according to claim 4 in which the second source of pressure comprises a hydraulic pressure pump for withdrawing brake hydraulic fluid from a reservoir and pressurizing the brake hydraulic fluid, an electric motor for driving the pump, and a regulator for applying a relatively high voltage to the motor for a given interval after commencement of the automatic intensification for the initial pressurization interval and subsequently applying a relatively low voltage to the motor.

6. A wheel brake pressure controlling system according to claim 4 in which the brake pressure operating means comprises switching valve means for switching between a first position in which the wheel brake is disconnected from the second source of pressure and communicates with the first source of pressure, and a second position in which the wheel brake is disconnected from the first source of pressure and communicates with the second source of pressure, modulator valve means having an increasing position where the wheel brake communicates with the second source of pressure, a decompressing position in which the wheel brake communicates with the reservoir, and a holding position where the wheel brake is disconnected from the second source of pressure and the reservoir, and cut-off valve means for switching between an operative position in which a communication is established between a suction port of the second source of pressure and the reservoir and an inoperative position in which a communication between the suction port of the second source of pressure and the reservoir is interrupted, the output means having a duty cycle holding mode in which an increasing sub-mode in which the modulator valve means assumes an increasing position and the cut-off valve means assumes an inoperative position and a holding sub-mode in which the modulator valve means assumes a holding position and the cut-off valve means assumes an operating position are alternately repeated.

7. A wheel brake pressure controlling system according to claim 6 in which the information processing means estimates a slip rate of a wheel, decompresses the hydraulic pressure of a wheel brake by a given amount whenever the slip rate is equal to or greater than a given value during the initial pressurization interval, and then commands a duty cycle holding mode to the output means.

8. A wheel brake pressure controlling system for a vehicle including a first source of pressure for generating a primary pressure corresponding to an operating force resulting from a driver's operation, a second source of pressure for generating a secondary pressure independently from a driver's operation, a brake pressure operating means for selectively supplying one of the primary and secondary pressure to a plurality of wheel brakes of the vehicle, information processing means for estimating a turning of a vehicle and for judging whether the estimating turning of the vehicle lies in an over-steer or an under-steer region or not and whenever the turning of the vehicle is in an over-steer or an under-steer region, for determining at least one wheel brake of the plurality of wheel brakes whose pressure is to be intensified, and output means for supplying the secondary pressure through the brake pressure operating means to the wheel brake which has been determined to have its pressure intensified:

wherein the information processing means judges whether a turning of the vehicle lies in a reference region which is located outside the over- or under-steer region or not, and drives the second source of pressure in order to generate the secondary pressure whenever the turning of the vehicle lies in the reference region.

* * * * *